United States Patent [19]

Katanics et al.

[11] Patent Number: 5,405,152
[45] Date of Patent: Apr. 11, 1995

[54] METHOD AND APPARATUS FOR AN INTERACTIVE VIDEO GAME WITH PHYSICAL FEEDBACK

[75] Inventors: George T. Katanics, Burbank; Philip A. Groves, Glendora, both of Calif.

[73] Assignee: The Walt Disney Company, Burbank, Calif.

[21] Appl. No.: 71,745

[22] Filed: Jun. 8, 1993

[51] Int. Cl.⁶ .............................................. A63F 9/22
[52] U.S. Cl. ................................. 273/438; 273/148 B
[58] Field of Search ........... 273/433, 434, 438, 148 B, 273/DIG. 28, 85 G

[56] References Cited

U.S. PATENT DOCUMENTS

| | | | |
|---|---|---|---|
| 4,121,488 | 10/1978 | Akiyawa | 273/438 |
| 4,488,017 | 12/1984 | Lee | 273/438 |
| 4,660,828 | 4/1987 | Weiss | 273/438 |
| 4,720,789 | 1/1988 | Hector et al. | 273/438 |
| 4,817,950 | 4/1989 | Goo | 273/148 B |
| 4,925,189 | 5/1990 | Braeunig | 273/148 B |
| 5,076,584 | 12/1991 | Openiano | 273/148 B |
| 5,139,261 | 8/1992 | Openiano | 273/148 B |
| 5,195,746 | 3/1993 | Boyd et al. | 273/148 B |
| 5,229,756 | 7/1993 | Kosugi et al. | 273/438 |
| 5,290,034 | 3/1994 | Hineman | 273/148 B |

FOREIGN PATENT DOCUMENTS 4276281 10/1992 Japan ..................... 273/438

Primary Examiner—Jessica J. Harrison
Attorney, Agent, or Firm—Hecker & Harriman

[57] ABSTRACT

An interactive video game with physical feedback is described. A plurality of icons are provided on a display. Each icon represents one of a plurality of players. A plurality of positioning devices, one for each player, are provided in front of the display. Each player stands on the positioning device, and the positioning device reacts to shifts in weight of the player and tilts in the direction in which the player shifts. Movement of the positioning device causes the display icon corresponding to the positioning device to move accordingly. Each player attempts to cause collisions with the icons of other players and avoid the icons of players attempting to cause collisions. In one embodiment, each player begins with a predetermined number of points. A player on the receiving end of a collision loses points, A player causing a collision does not lose points. At the end of a predetermined time period, the player with the most points is the winner. In addition to the display icons representing each player, the display includes planets, galaxies, and meteor showers. Colliding with any of these objects results in loss of points. The meteor shower occurs at random one or more times during active game play. When there is a collision involving a display icon, a feedback mechanism causes the positioning means to shake. This tactile feedback adds realism to the playing of the game.

11 Claims, 19 Drawing Sheets

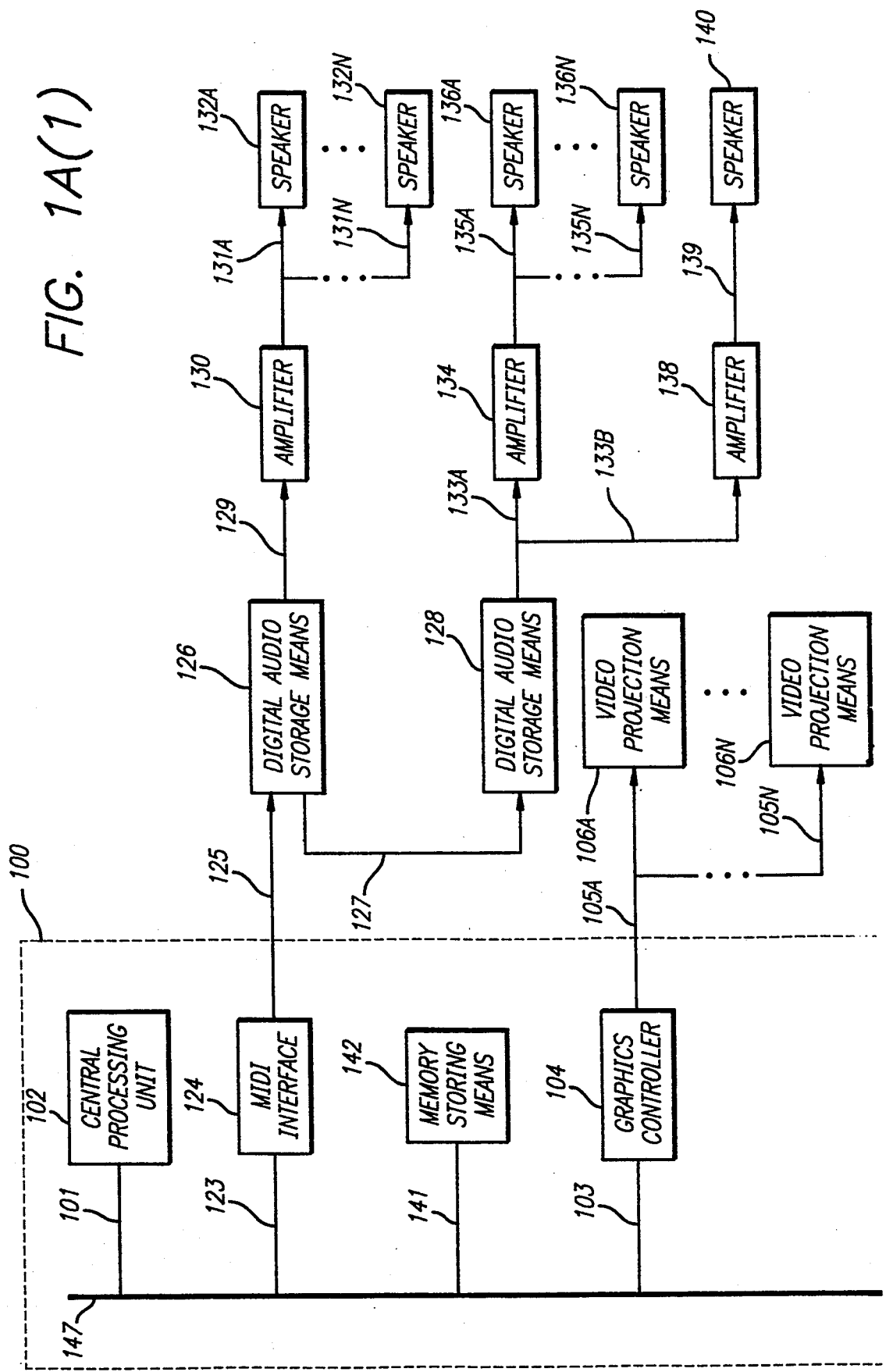
FIG. 1A(1)

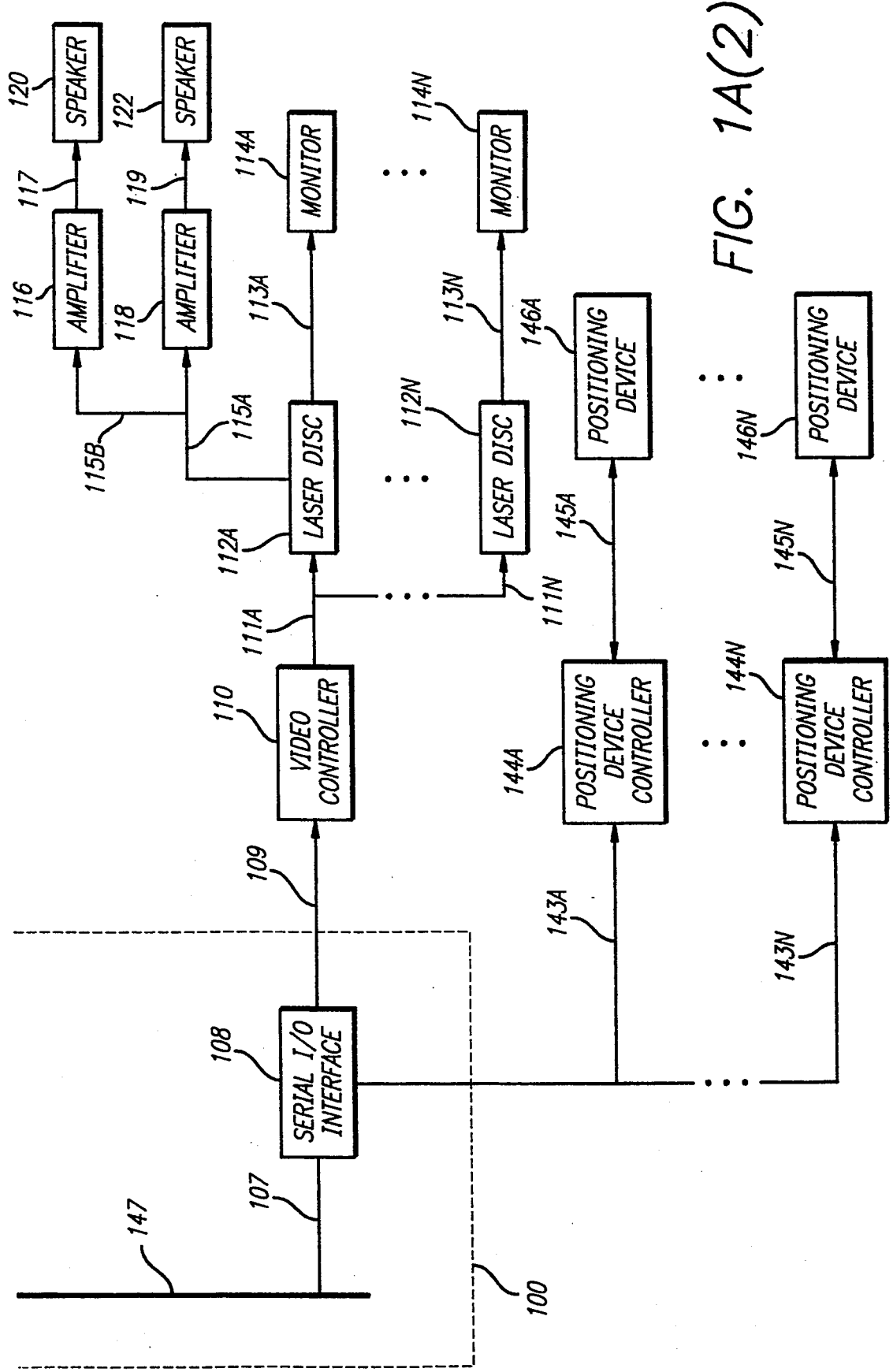
FIG. 1A(2)

METHOD AND APPARATUS FOR AN INTERACTIVE VIDEO GAME WITH PHYSICAL FEEDBACK

BACKGROUND OF THE INVENTION

1. Field of the Invention

This invention relates to the field of interactive video games.

2. Background Art

Existing video games have the disadvantage of lack of physical interaction with the game. Typically only the player's hands are used to manipulate controllers, such as a joystick, buttons, trackballs, etc. As a result, the games are relatively sedentary. The feedback from a prior art video game is only visual and or auditory. When a goal is accomplished during play of the game, such as "shooting" a space ship, "striking" a displayed opponent, etc. the act itself is displayed, and a confirming sound or musical cue is generally reproduced.

Some prior art video games provide movement of the player in response to play of the game. For example, video games that involve driving or flying may include, for example, a cockpit in which the player sits. Movement of the joystick causes the cockpit itself to tilt left or right, or possibly to pitch forward and back, in association with movement of a display element or icon. Even in such a system, the player is relatively passive, all movement being initiated by movement of the joystick. In addition, there is no other event feedback in the event of collisions, etc.

Some prior art video games employ a stylized "motorcycle" on which a player sits. By leaning left or right, and turning the handlebars, the player "steers" a displayed motorcycle. Such a system is limited to left and right movement of the player and lacks tactile event feedback.

Another disadvantage of prior art video games is the limited number of players that can participate simultaneously. In prior art video games, typically two players alternate play, with no interaction between them. In some games, players can compete simultaneously as a team or sometimes as opponents. However, prior art video games do not provide the ability for large numbers of players to participate simultaneously.

SUMMARY OF THE INVENTION

An interactive video game with physical feedback is described. A plurality of icons are provided on a display. Each icon represents one of a plurality of players. A plurality of positioning devices, one for each player, are provided in front of the display. Each player stands on the positioning device, and the positioning device reacts to shifts in weight of the player and tilts in the direction in which the player shifts. Movement of the positioning device causes the display icon corresponding to the positioning device to move accordingly. When the player shifts left, the positioning device shifts left, and the display icon moves left. Each player moves the player's own positioning device to control and move the player's corresponding display icon.

Each player attempts to cause collisions with the icons of other players and avoid the icons of players attempting to cause collisions. In one embodiment, each player begins with a predetermined number of points. A player on the receiving end of a collision loses points, A player causing a collision does not lose points. At the end of a predetermined time period, the player with the most points is the winner.

In addition to the display icons representing each player, the display includes planets, galaxies, and meteor showers. Colliding with any of these objects results in loss of points. The meteor shower occurs at random one or more times during active game play.

When there is a collision involving a display icon or the edge of the display, a feedback mechanism causes a composite jolt to the positioning device in one of a number of possible ways, depending on the type and speed of collision. This tactile feedback adds realism to the playing of the game. In addition to the auditory and visual cues of a collision, the player actually feels the bumps indicating a collision. The collision is affected on the positioning device itself, requiring the player to recover or attempt to hold a desired course during game play.

In addition to the objects with which a player's icon may collide, there are also areas on the display representing regions of turbulence. These regions are found around certain planets and gas clouds.

When a player's icon enters one of these turbulent regions, the feedback mechanism causes the positioning device to vibrate at varying speeds and in a number of possible ways depending upon the area of turbulence and the speed of motion of players' icons. This tactile feedback also adds realism to the playing of the game.

BRIEF DESCRIPTION OF THE DRAWINGS

FIG. 1A is a block diagram of the game system of the present invention.

DETAILED DESCRIPTION OF THE INVENTION

A method and apparatus for providing an interactive video game with physical feedback is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1B:
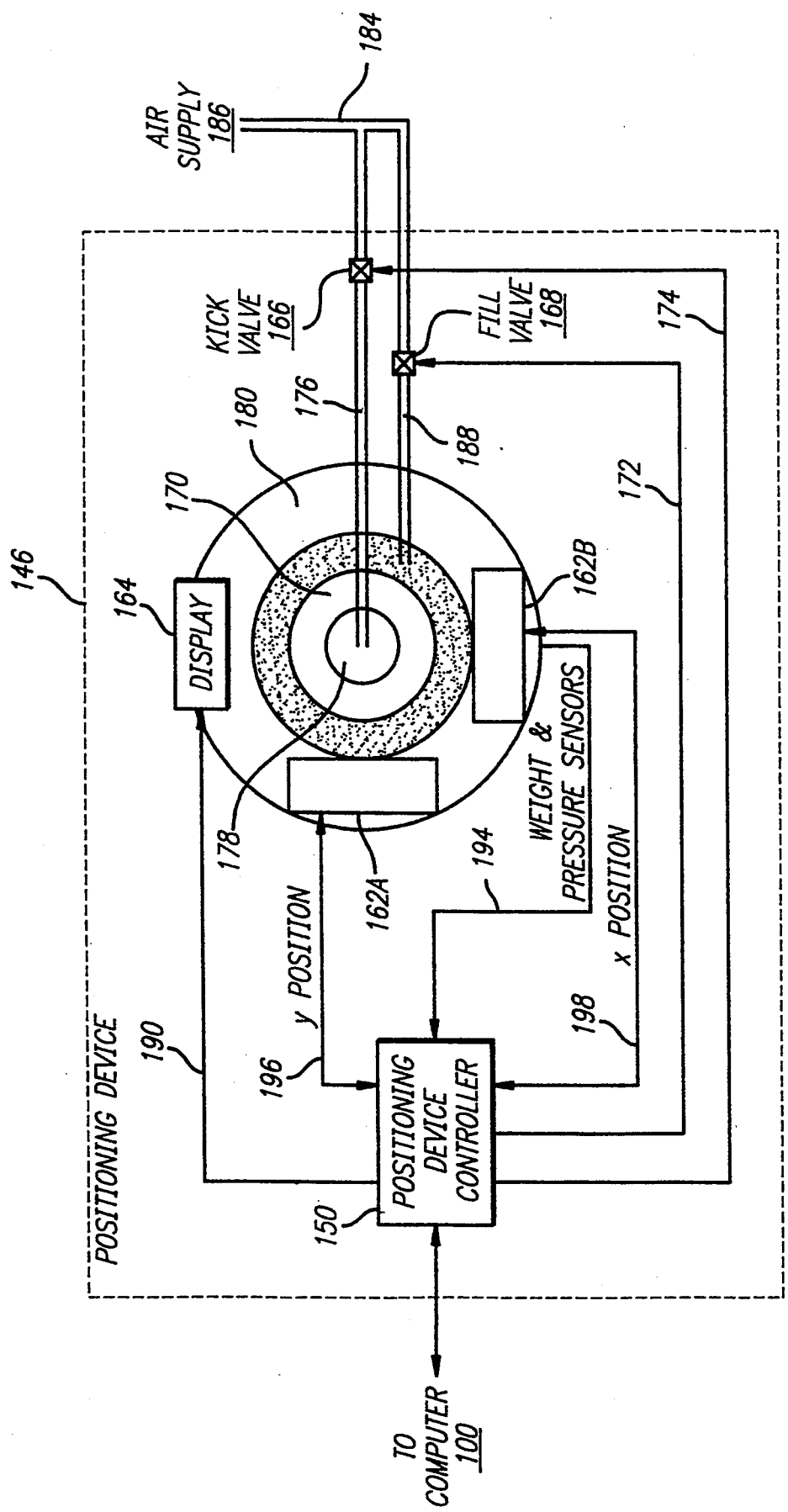
FIG. 1B is a top view of a positioning means.
Figure 1C:
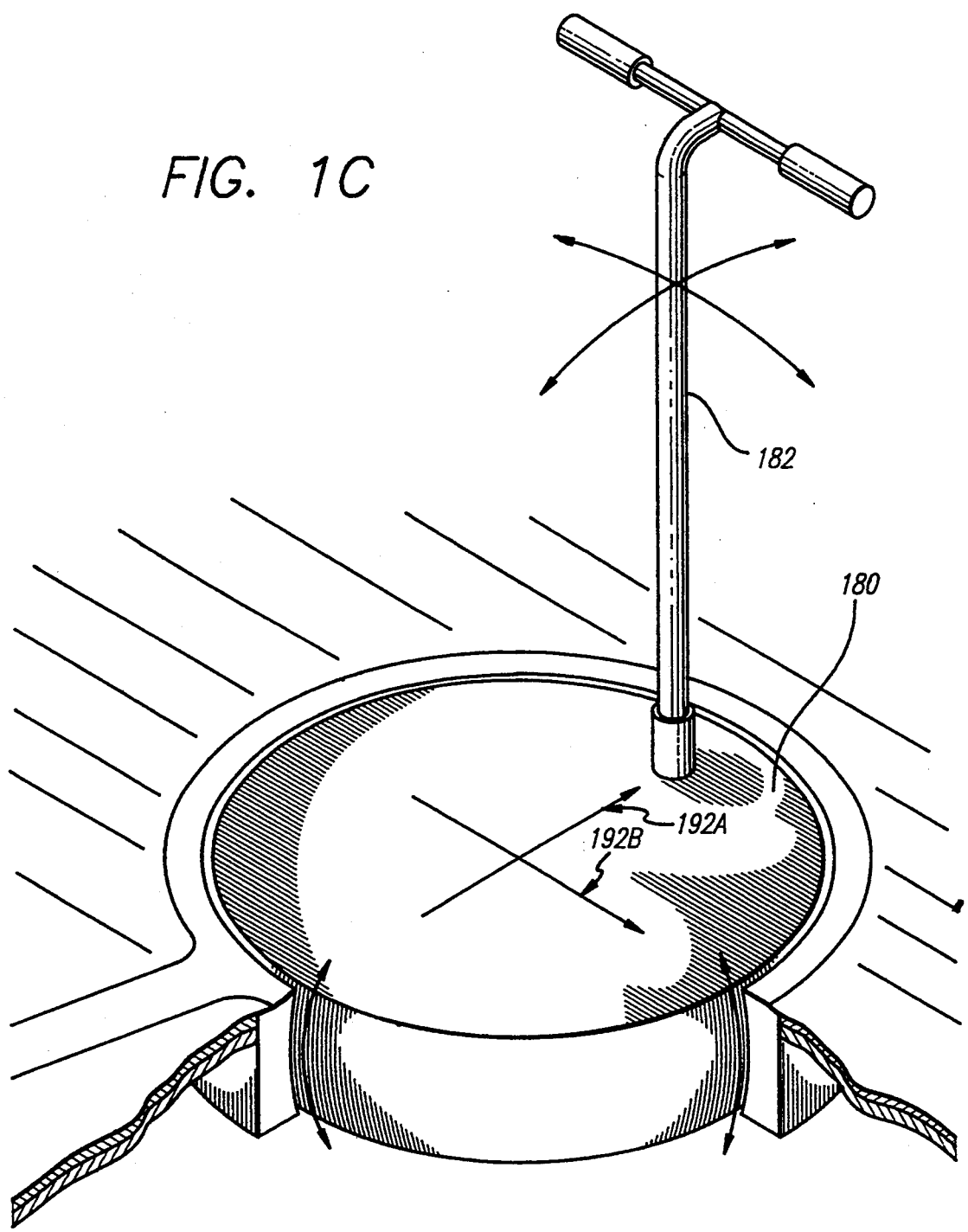
FIG. 1C is a perspective view of a positioning means.

The present invention is a video game for multiple simultaneous participation. Each player "rides" his own joystick or positioning device. A perspective view of a positioning device that can be used with the present invention is illustrated in FIG. 1C. Referring to FIG. 1C, a steering mechanism 182 is mounted on the top surface of a support platform 180. The steering mechanism 182 is mounted to the top surface of upper platform 180 at a radial position near the periphery of circular platform 180. A player stands on support platform 180 and holds the handlebars of steering mechanism 182. By shifting the players weight, the support platform is tilted about a central pivot. Displacement of the support platform is translated into position signals that control movement of a display icon.

Figure 13:
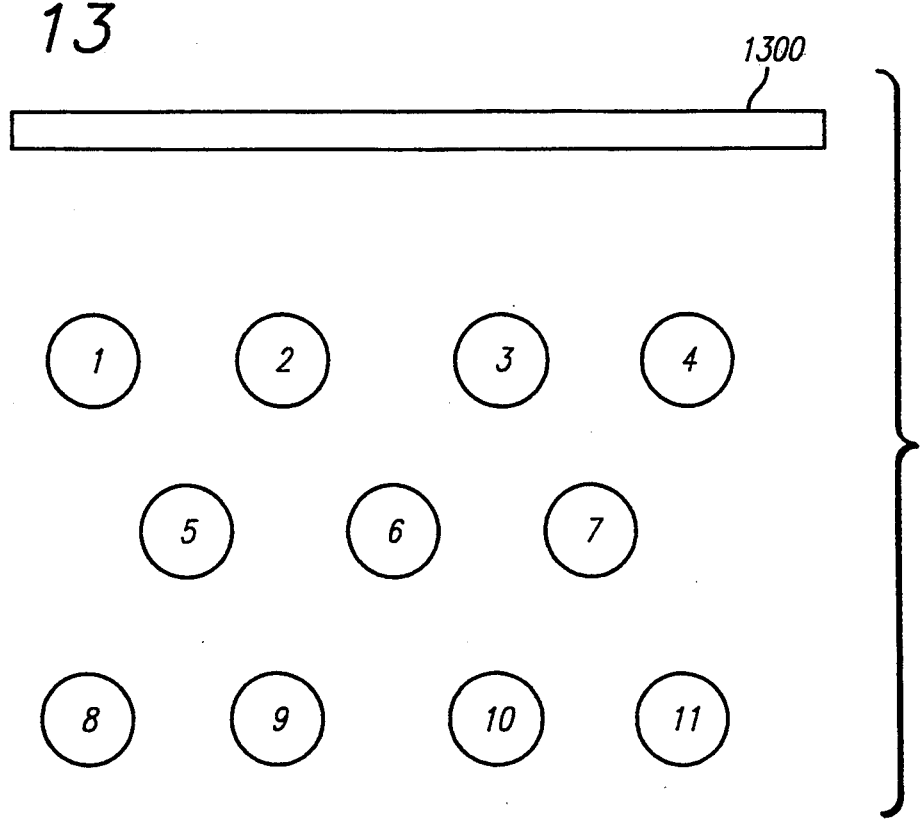
FIG. 13 illustrates the arrangement of the positioning devices with respect to the display.

FIG. 13 illustrates one arrangement of positioning devices in the present invention. Eleven positioning devices 1–11 are disposed in an array of three rows of four, three, and four positioning devices respectively. The plurality of positioning devices 1–11 are disposed in front of a display 1300. One display icon is displayed on the display 1300 for each positioning device in the array.

Figure 14:
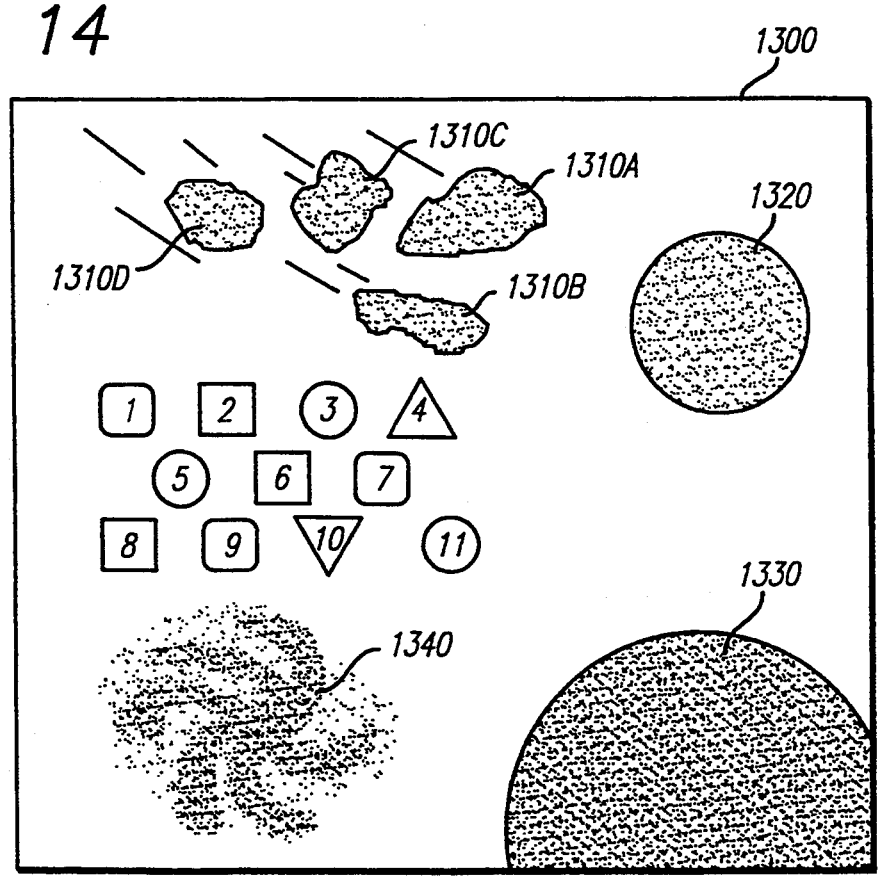
FIG. 14 illustrates the display of the present invention.

FIG. 14 illustrates the display 1300 of FIG. 13. The display 1300 displays a plurality of icons 1–11 that correspond to each of positioning devices 1–11. To aid a player in identifying his associated display icon, each icon includes a number corresponding to the number of the player's positioning device. In addition, each display icon has a different geometric border and/or color than any other icon, so that each display icon has a unique appearance. In the present invention, the display icons may be thought of as space craft or space ships that are to be piloted (i.e. "steered") by each player. The display icons are illustrated in the "begin game" orientation, to permit easy identification. During active game play, each player may move his display icon about the display 1300 by moving his associated positioning device.

The image viewable by a player includes other objects such as planets 1320 and 1330, gas cloud 1340, and meteors 1310A–1310D. These objects have special properties that affect the movement of the display icons during the active play of the game.

During the pre-game period, players are encouraged to step onto a positioning device. Each positioning device is marked with a representation of a display icon in the same shape and color, and with the associated number. In addition, the physical location of each positioning device in the array corresponds to the physical location of the display icon in the pre-game array.

During game play, each player uses shifts in body weight to move the positioning device. In response, the player's associated display icon moves in the direction in which the positioning device is tilted. In this manner, the player "steers" the display icon about the display. The player attempts to "hit" other display icons to obtain points, and to avoid collisions with other display icons, the planets 1320 and 1330, and meteors 1310A–1310D to avoid the deduction of points. The player can move the player's associated display icon for a fixed period of time. At the end of the time period, the player with the most points is the winner.

When a player's associated display icon collides with another object or the edge of the display 1300, a feedback mechanism causes a composite jolt of that player's positioning device. In this manner, the play of the game is more realistic, as auditory, visual and physical feedback is provided to the player. When the display icon of a player moves into the gas cloud 1340, the feedback system provides continuous shaking and vibration of the positioning device, as if the player is subjected to drag turbulence.

Positioning Device

The present invention uses a positioning device on which a player stands. The device consists of a support member and a steering bar or handle bar to be grasped by the player. The player shifts his weight on the support member and thereby displaces the support member. Position sensors coupled to each positioning device detect the displacement and translate it into x-y coordinates. One such positioning device that can be used with the present invention is described in co-pending U.S. patent application Ser. No. 08/069,566, filed May 28, 1993, entitled *Apparatus for Providing Position Signals* and assigned to the assignee of the present invention and incorporated herein by reference.

The positioning device provides the position and weight data and player feedback for the present invention. FIG. 1B provides a top-view of the Positioning Device 146 comprising upper platform 180, linear transducers 162A–162B, air cylinder 178, and pneumatic spring 170.

Linear transducers 162A–162B produce Y- and X-position signals 196-198, respectively, that are provided to Device Controller 150. Memory storage means within the positioning device 146 hold algorithms for converting the platform position, x-position 198 and y-position 196, and player weight, weight and pressure sensors 194, into the correct game information for transmission to CPU 100. That is, Device Controller 150 transfers Y- and X-position signals 196-198 as well as weight and pressure sensor signals 194 to computer 100 through communication channel 145.

Device Controller 150 receives weight and pressure signals 194 from air cylinder 178. The Device Controller 150 provides a fill signal 172 and a kick signal 174 to fill valve 168 and kick valve 166, respectively. Kick valve 166 controls air flow 184 to air cylinder 170 from air supply 186. Similarly, fill valve 168 controls air flow 184 from air supply 186 to platform stabilization air cylinders that are located along the periphery of platform 180.

Kick valve 166 (or pneumatic servo valve) in FIG. 1B produces various "bumps" in the system in response to a kick control signal 174 from the computer 100 through control/interface 144. The kick control signal 174 opens and closes the pneumatic servo valve 166 causing pancake air cylinder 178 to expand thereby driving platform 180 upward in a vertical direction momentarily. These "bumps" are used in the present invention to provide physical signals or cues to a player such as when the player's vehicle collides with an object in the game. This provides an added dimension of realism to the computer game.

The Device Controller 150 operates the valves 166 and 168 using kick and fill control signals 174-172, respectively. The weight and pressure sensor signal 194 is provided to Device Controller 150 from the linear transducers of air cylinder 178. User-detection sensors are incorporated in the system to detect when a user is on upper platform 180. The weight and pressure signal 194 is provided to Device Controller 150 to indicate the presence of a user. In response, Device Controller 150 provides fill control signal 172 to fill valve 168 causing it to retract.

Once the user is loaded onto upper platform 180, upper platform 180 is able to pivot smoothly through 360°. FIG. 1C illustrates the reference coordinate system for X- and Y- position signals 198-196 generated by the system. The X-Y coordinate system indicates that Y values change in the longitudinal direction along the front-back axis 192A. Accordingly, X values change in the lateral direction along the left-right axis 192B. The Y- and X-position signals 196-198 produced by linear transducers 162A-162B are provided to Device Controller 150.

In one embodiment of the present invention, linear transducers 162A-162B are mounted 45° to the front-back axis 192A and left-right axis 192B. To produce front-back and left-right X and Y vectors, the Y-and X-position signals 196-198 must be combined and rotated by Device Controller 150.

Device Controller 150 processes and transmits the position signals 196-198 to computer 100 through communication link 145. Display 164 provides a tally of the score achieved by a player during the operation of the present invention. Further, at the end of a game, each positioning device is placed in a locked, stationary position.

Positioning Calculations

If X and Y transducers 162A-162B are not placed in line with the left-to-right (i.e., X) axis or the front-to-back (i.e., Y) axis (respectively), the X and Y values must be rotated to produce X and Y vectors relative to the left-to-right and front-to-back axes of the platform of the positioning device.

Figure 1D:
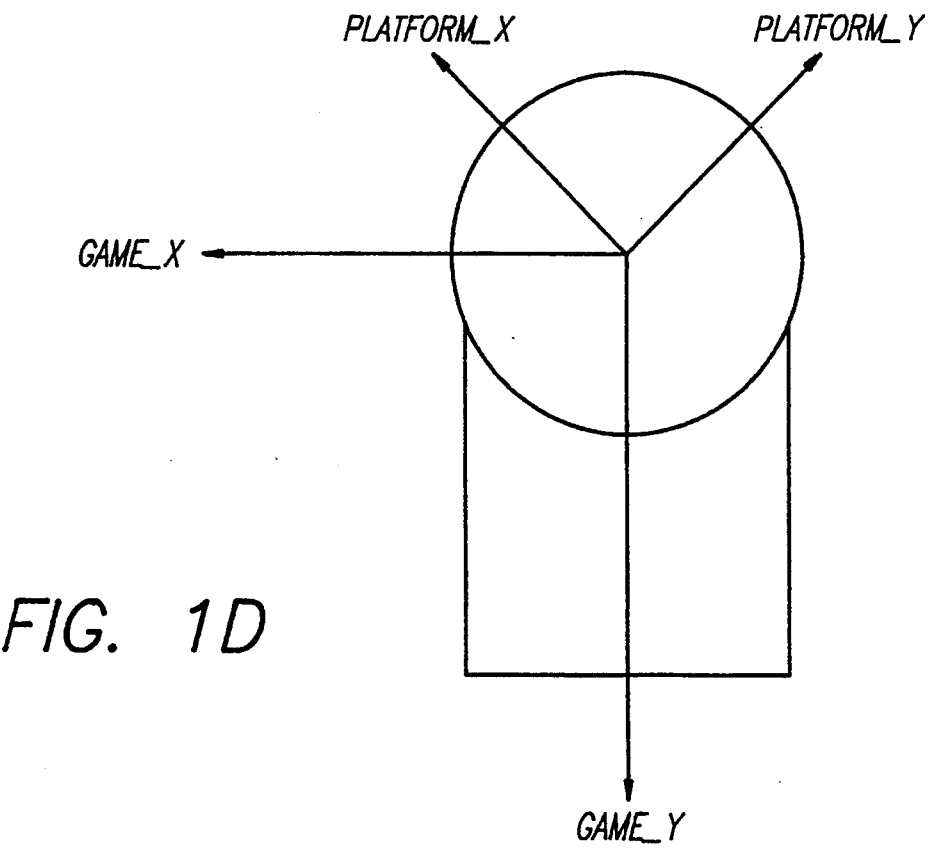
FIG. 1D illustrates the platform and game axes.

If linear transducers 162A-162B are mounted 45° to the front-back axis 192A and left-right axis 192B of the positioning device, the Y-and X- position signals 196-198 must be combined and rotated by Device Controller 150 to produce front-back and left-right X and Y vectors. FIG. 1D illustrates the orientations of the raw input, and the positioning vectors generated by Device Controller 150. That is, X and Y input values received from the positioning device and within the platform_x and platform_y coordinate system must be combined and rotated to produce X and Y positional input within the game_x and game_y coordinate system as follows:

$$rotated\_X = (platform\_x + platform\_y) * \cos(45°)$$

$$rotated\_Y = (-platform\_x - platform\_y) * \cos(45°)$$

To increase the speed of the calculation, cos(45°) can be approximated to 707/1000. This approximation should have sufficient accuracy for game play. Thus, the resultant range of the rotation calculation is ±723. If the X and Y position values expected by the game play module are within the range of 0-254, a further scaling can be performed on the rotated value (i.e., rotated_x or rotated_y) to produce a game value within the expected range. The scaling calculation is as follows:

$$game\_value = (rotated\_value + 723) * 100) / 569)$$

Further, platform readings for X and Y axes should be centered at zero when the platform is in its stabilized position. To meet this requirement, raw platform readings are normalized as follows:

$$platform\_x = raw\_x\_reading + x\_offset$$

$$platform\_y = raw\_y\_reading + y\_offset$$

where:

x_offset and y_offset are calculated from a series of x and y readings taken each time the positioning device is subjected to a calibration process.

Operation Overview

Figure 2:
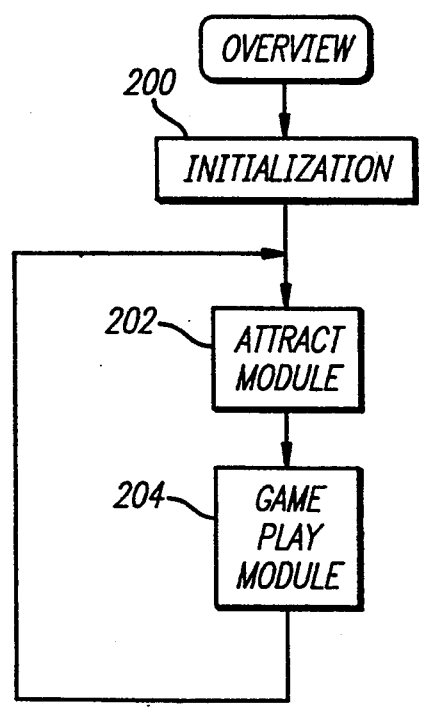
FIG. 2 is a flow diagram of the overall operation of the invention.

FIG. 2 illustrates an overview of a processing flow of the operation of the present invention. An initialization procedure is invoked at processing block 200. Once the initialization procedure is completed, the attract mode of the present invention is invoked at processing block 202. The present invention operates in the attract mode when a game is not in progress (e.g., in between games or when a game is paused). In attract mode, the present invention generates visual and audio effects to provide a center of interest for potential players. Once the attract sequence is completed and a game is not in a pause mode, the game play module is invoked at processing block 204. The system returns to attract mode after the game play module is completed.

Initialization

Figure 5:
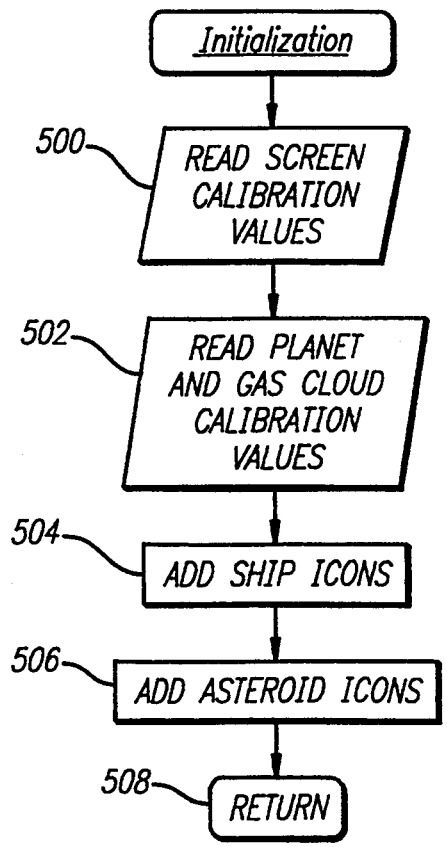
FIG. 5 is a flow diagram of the initialization process.

An initialization process is performed when the system is initially invoked. Referring to FIG. 5, Initialization reads screen calibration values from a file. These values are used to provide a smooth transition between the multiple displays used in the present invention. The present invention uses multiple rear projection screens. The output to each screen is blended with the other screen output such that the screens appear to be one screen. The blend is provided by overlapping some portion of the screens' display area. When an object moves from one screen to the next, the object appears to remain in the same position on the display, and the object's coordinates are updated to reflect its new coordinate location in the new screen.

A calibration process is performed to identify the areas of overlap, a transition point between the screens, and the offset (in pixels) from one screen to the next. The calibration process establishes the coordinates of the top left corner of each screen relative to the top left screen, and the coordinates of the dimensional props as seen by the game software.

Once the calibration has been performed, calibrations are only necessary in special cases such as when equipment is physically moved from its current location. However, the calibration process can be performed any time the game is in attract mode and paused.

The present invention provides the ability to provide objects that are viewable by the players as dimensional props positioned behind the "pepper's ghost" glass. These objects are merged with other, projected images into a single, combined image. For such objects, a calibration process further provides calibration data to indicate the location of these objects relative to the display and the projected images. This information can be used to determine, for example, when ships collide with these objects.

Referring to FIG. 5, the screen calibration data from the calibration process are read at block 500. The calibration data for dimensional prop objects (e.g., planet or gas cloud) are read at block 502. At processing block 504, the "ship" game icons are added to the system. The process of adding an icon includes drawing the icon in an offscreen memory location. The icon in memory can be copied to or erased from an onscreen location during the animation process to speed up animation during a game. At block 508, processing returns to the GamePlayModule (i.e., after processing block 406 in GamePlayModule).

Figure 4A:
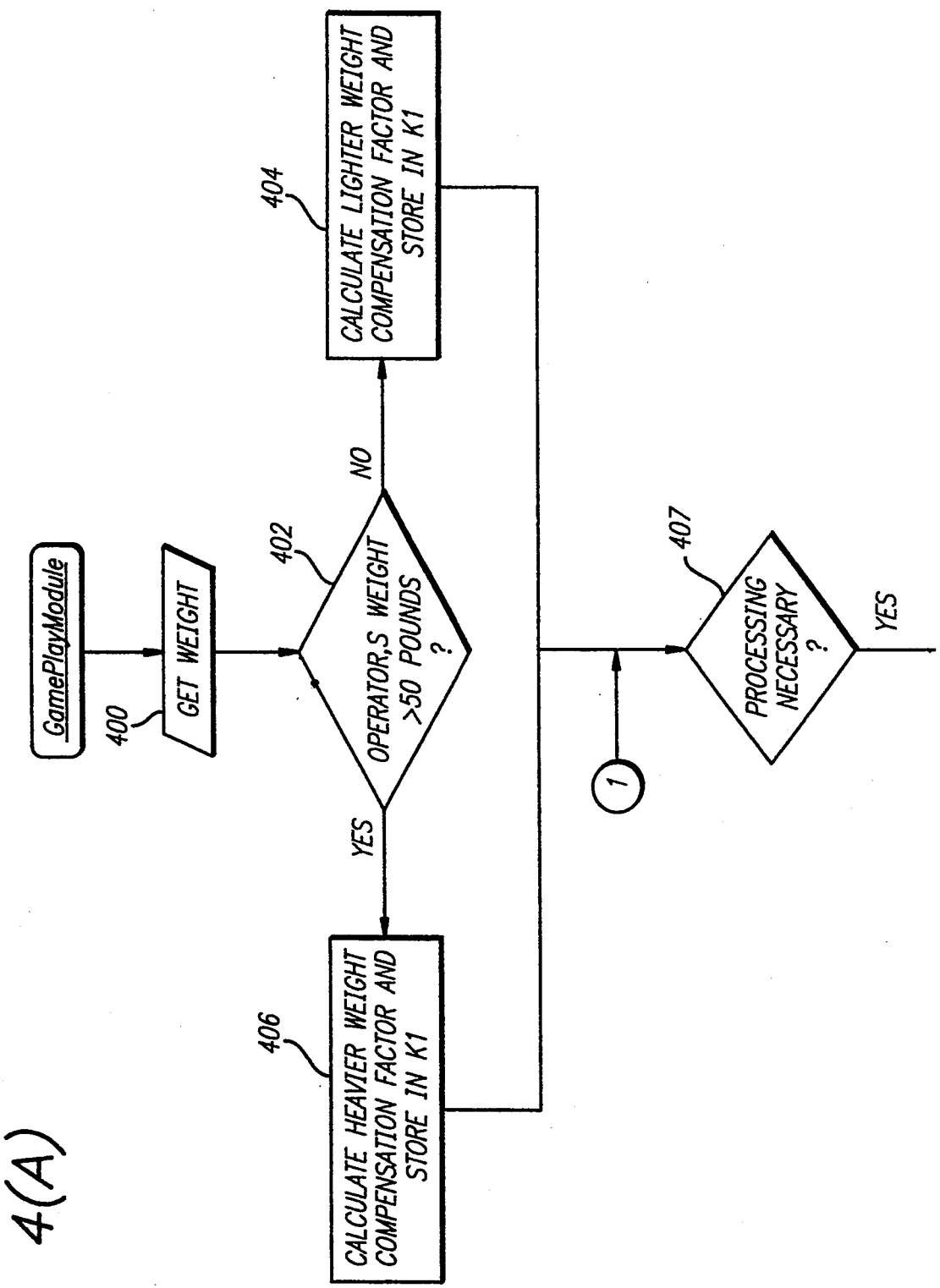
FIG. 4 is a flow diagram of the game play mode of the invention.
Figure 4B:
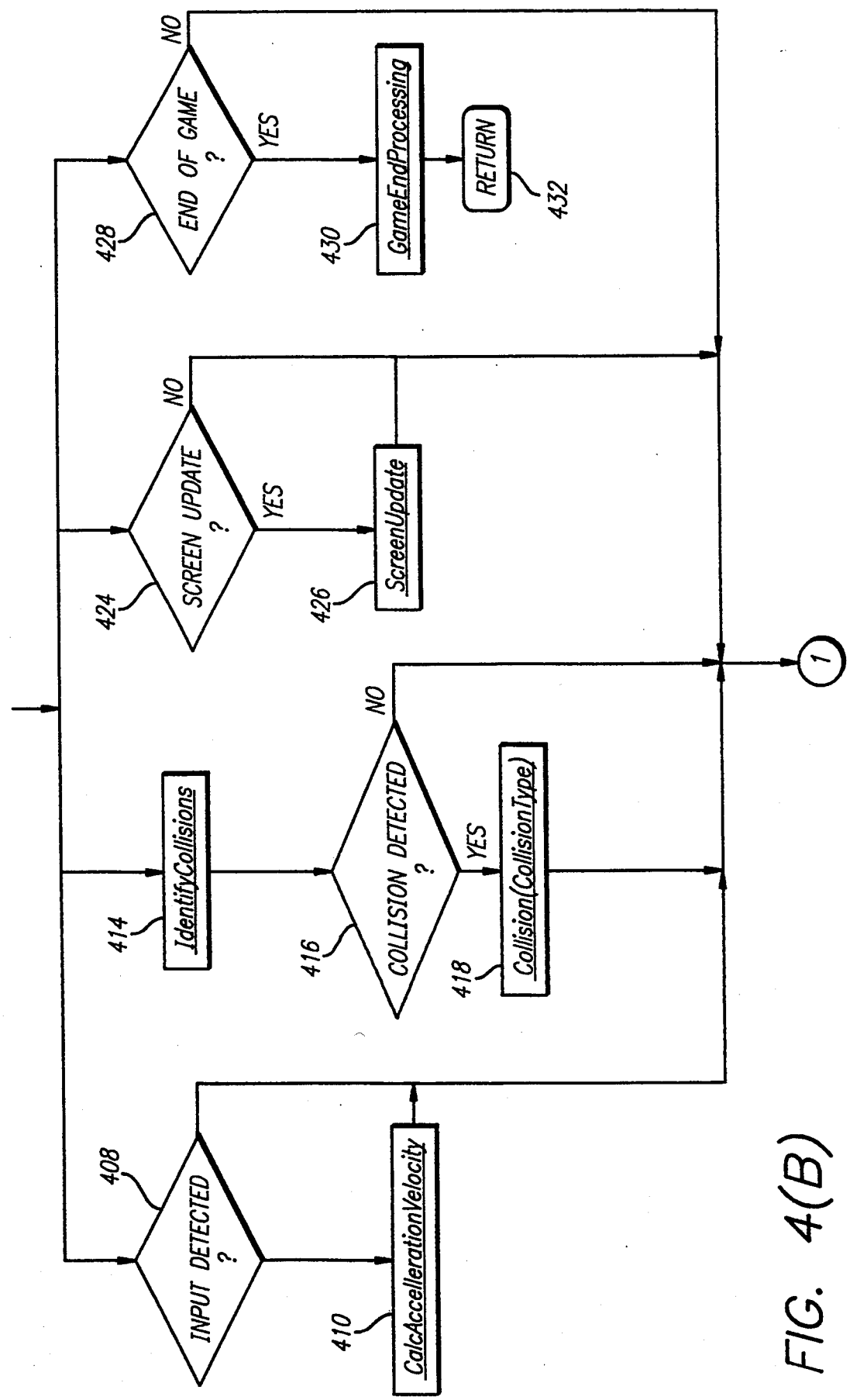

To provide real-time response to the players, GamePlayModule illustrated by FIG. 4 creates a virtually simultaneous reaction to different processing stimuli such as player input, collisions between two or more icons, screen updates, and game termination. At decision block 407 (i.e., "processing necessary?"), GamePlayModule responds to processing stimuli, or waits for such stimuli.

Attract Module

Figure 3:
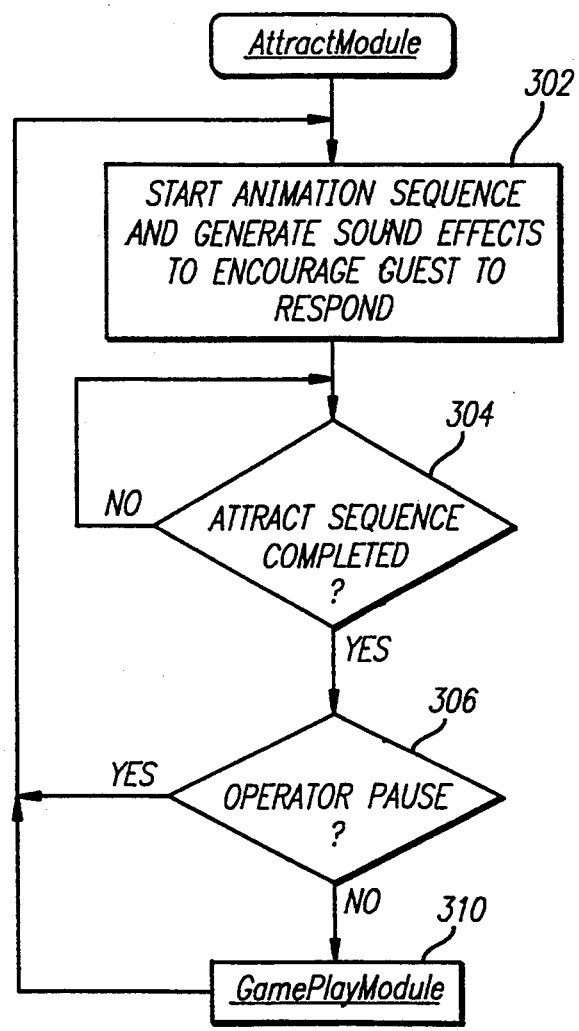
FIG. 3 is a flow diagram of the attract mode of the invention.

Referring to FIG. 3, the Attract Module of the present invention begins, at processing block 302, to display an animation sequence and to generate sound effects. If, at decision block 304 (i.e., "attract sequence completed?"), the attraction sequence is not finished, processing continues to check for completion of the attract sequence at decision block 304. If the attract sequence is finished at decision block 304, processing continues at decision block 306.

A game may be paused during its execution for various reasons. When a pause mode is detected, the attract sequence is invoked and loops indefinitely, or until a resume mode is detected. When play is to be resumed, play starts at the end of the current attract sequence. At decision block 306 (i.e., "operator pause?"), if a pause is not detected, processing continues at decision block 308 (i.e., "end of attract sequence?"). If the current attraction sequence is not finished at decision block 304, processing continues to check for the completion of the sequence at decision block 304 (i.e., "attract sequence completed?"). When the completion of the attract sequence is detected at decision block 304, the GamePlayModule is invoked at processing block 310. When the GamePlayModule is finished, the attract sequence starts at processing block 302.

GamePlayModule

When the GamePlayModule is invoked, players are astride a positioning device of the type illustrated in FIG. 1C. A player can determine the direction and speed of an associated display icon by tilting the device (i.e., by shifting weight) in a direction. The direction of the tilt, or pivot, determines the direction of movement of the game icon. The degree of change in the tilt determines the speed (i.e., faster or slower) of the movement of the display icon.

The positioning device further provides an ability to determine a player's weight. Weight information is used to make the positioning device more responsive to each player. In addition to the weight input, the GamePlayModule receives positioning input from the player via the positioning device, and responds by providing feedback to the player (e.g., via the screen icon).

FIG. 4 provides an implementation flow of the GamePlayModule. At processing block 400, a player's weight is input from the positioning device. A player's weight affects the ease with which the positioning device is moved, and may result in a "ship" icon that moves in a sluggish manner. Compensation without reference to a player's weight may result in a ship's movement that appears to jerk in each direction. Thus, information about a player's weight can be used to customize the feedback provided to a player.

To optimize the transmission of weight input from the positioning device to the game computer, weight input can be passed to the game computer as a byte containing a value from zero to two. A zero value indicates that no player is present. A value of one indicates a lighter player, and a value of two indicates a heavier player.

A compensation factor is applied to the velocity calculation to provide more of a response from a slighter movement of the positioning device by a lighter player (e.g., children). A second weight compensation factor is applied for heavier players (e.g., adults). Weighing a player at the beginning of the game is done to identify the correct weight compensation factor to be used to scale the raw X and Y positioning input from the position device.

If the player's weight is less than or equal to a weight threshold (e.g., fifty pounds) at decision block 402 (i.e., "player's weight >50 pounds?"), a "lighter weight" compensation factor is calculated at processing block 404, and processing continues at decision block 407. If the player's weight is greater than a given weight threshold, a second weight compensation factor is selected at processing block 406, and processing continues at decision block 407. Processing continues by identifying processing requirements (e.g., input detected from a player, collision detected, screen update, or end of game) at decision block 407 (i.e., "processing necessary?"), and processing them when necessary.

Player Input

At decision block 408 (i.e., "input detected?"), the system reacts to input detected from the player. If no input is detected, processing continues by identifying other processing requirements at decision block 407 (i.e., "processing necessary?"). If input is detected at decision block 408, CalcAccellerationVelocity is invoked at processing block 410.

CalcAccelerationVelocity

Movement of a player's positioning device is used to determine the direction and speed of the player's display icon. CalcAccellerationVelocity uses this movement, or tilt, of the positioning device to calculate the speed that the player's display icon travels in the direction of the tilt.

The tilt is input in the form of x and y values. In the preferred embodiment, the tilt in either the x or y direction is a number between zero and two hundred and fifty-four (i.e., 254). A zero value represents the extreme movement on the x and y axes in the leftward or downward directions, respectively. A value of 254 represents extreme movement in the right and upward direction on the x and y axes, respectively. A value in the exact middle of the range represents no change in movement.

Figure 6:
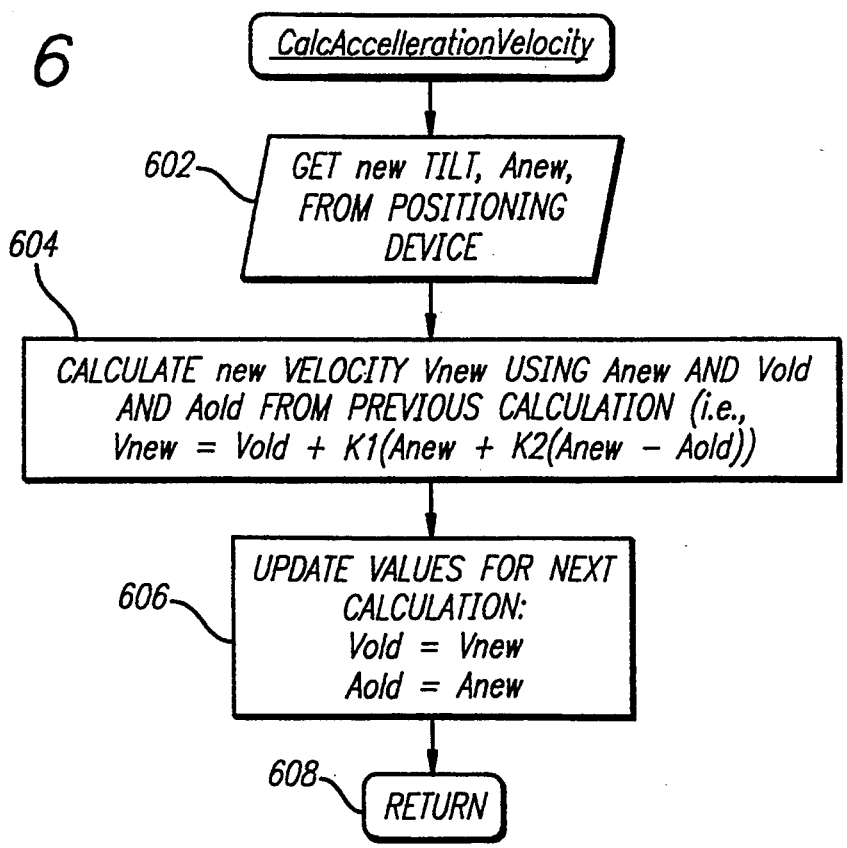
FIG. 6 is a flow diagram illustrating the calculation of acceleration and velocity.

Referring to FIG. 6, the new tilt, Anew is obtained from the positioning device at processing block 602 by subtracting the offset for the center position (i.e., determined at calibration) from the positioning device input. The current tilt, previous tilt, and two compensation factors (i.e., a weight compensation factor and a derivative control) are used to calculate a new velocity. The new velocity is calculated at processing block 604 as follows:

$$V_{new} = V_{old} + K_1(A_{new} + K_2(A_{new} - A_{old}))$$

where:

$V_{new}$ is the velocity computed in this calculation;

$V_{old}$ is the velocity computed in the previous calculation;

$A_{old}$ is the positioning device input used in the calculation of $V_{old}$;

$A_{new}$ is the most-recent positioning device input;

$K_1$ is the weight compensation factor; and $K_2$ is a scaling factor to adjust the amount of derivative control.

Once the new velocity is calculated, $V_{old}$ and $A_{old}$ are updated with the present velocity and tilt values, $V_{new}$ and $A_{new}$, respectively. Processing returns to GamePlayModule at block 608 (i.e., decision block 407 in GamePlayModule).

Game Object Collisions

Scoring is determined based on the number and type of collisions. A player causing a collision with another player is awarded points. A player that is collided with by another player, or by an asteroid, or who collides with a planet, loses points. So, for each collision, the type of collision is determined, and, in the case of a player to player collision, the "winner" of the collision is determined. The winner of a collision is the player whose display icon has the highest velocity.

Figure 7:
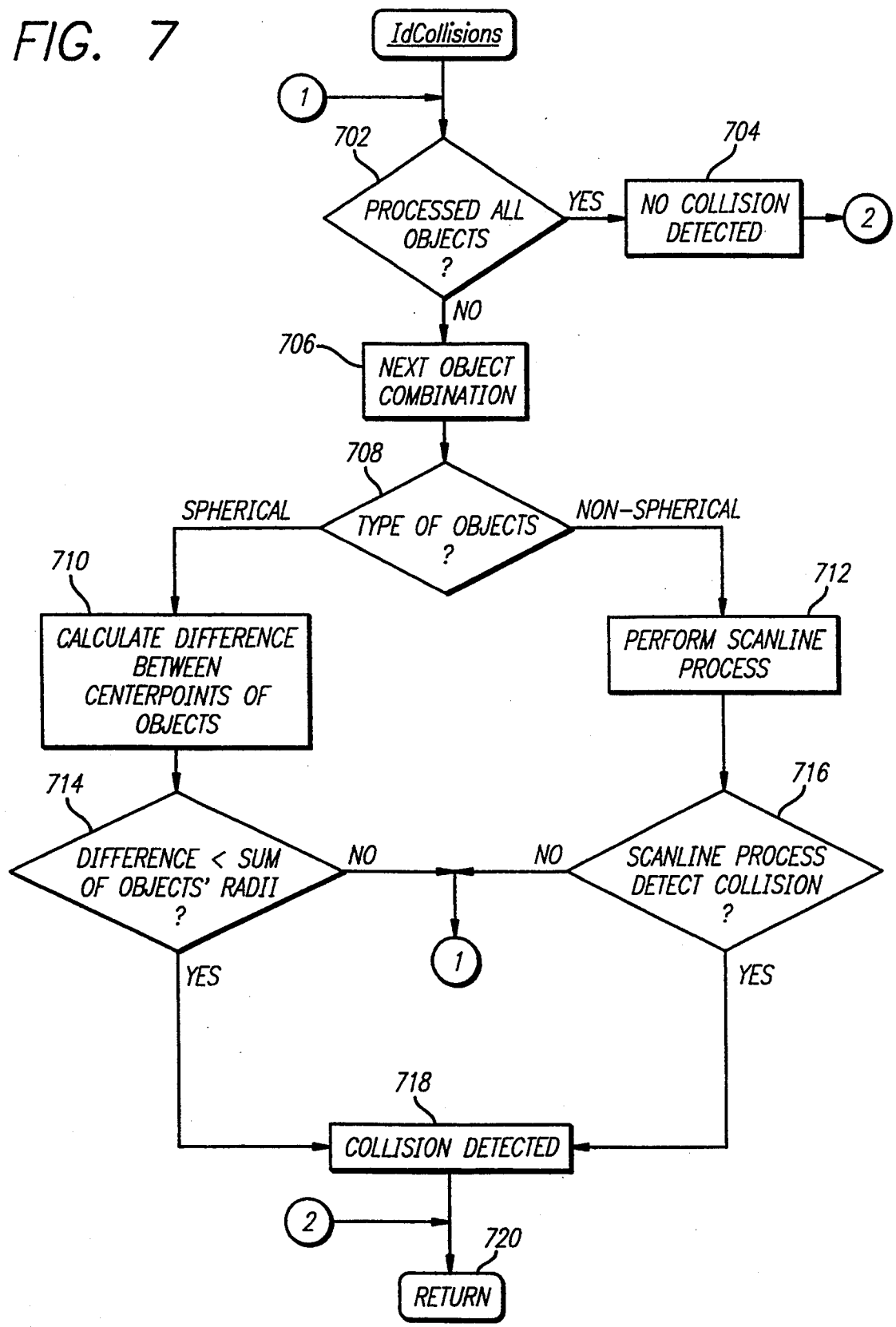
FIG. 7 is a flow diagram illustrating the identification of collisions.

In the GamePlayModule of FIG. 4, collisions between one or more game icons provide feedback to each player of a game object involved in a collision. At processing block 414, IdentifyCollisions is invoked to identify any collisions. FIG. 7 provides an implementation flow of IdentifyCollisions. Each game icon is examined with respect to all of the other game icons until all icon combinations are examined. At decision block 702 (i.e., "processed all objects?"), if all game icons have been examined, no collision exists, and processing returns to GamePlayModule at block 720. If all of the game icons have not been examined, processing continues at block 706 to get the next icon combination.

The process used to detect a collision depends on the footprint of each icon in the icon combination. Each game icon can be contained in a spherical or non-spherical object. The type is examined at decision block 708 (i.e., "type of objects?"). If the objects are spherical, a collision is detected by calculating the difference between the center points at processing block 710. The difference is compared to the sum of the radii at decision block 714 (i.e., "difference<sum of objects' radii?"). If the difference is greater than or equal to the sum of the objects' radii, no collision has occurred, and processing continues at decision block 702 (i.e., "processed all objects?"). If the difference is less than the sum of the radii, a collision condition exists and processing returns to GamePlayModule at block 720 (i.e., decision block 416 in GamePlayModule) to process the collision.

If the object is non-spherical at decision block 706 (i.e., "type of objects?"), a scan is performed to determine if the objects' footprints overlap. The result of the scan is examined at decision block 716 (i.e., "scanline process detect collision?") to determine whether a collision exists. If an overlap is not present, a collision has not occurred, and processing continues at decision block 702 (i.e., "processed all objects?"). If an overlap exists, a collision condition exists and processing returns to GamePlayModule at block 720 (i.e., decision block 416 in GamePlayModule) to process the collision.

Referring to the GamePlayModule illustrated by FIG. 4, if a collision condition is not detected in IdentifyCollisions, processing continues by identifying other processing requirements at decision block 407. Decision block 416 (i.e., "collision detected?"), determines whether a collision was detected by IdentifyCollisions. If a collision condition does not exist at decision block 416, processing continues at decision block 407 (i.e., "processing necessary?") to identify other processing requirements. If a collision is detected by IdentifyCollisions, Collision is invoked at processing block 418 to process the collision and provide feedback to the player.

Ship-Ship Collision

Figure 8A:
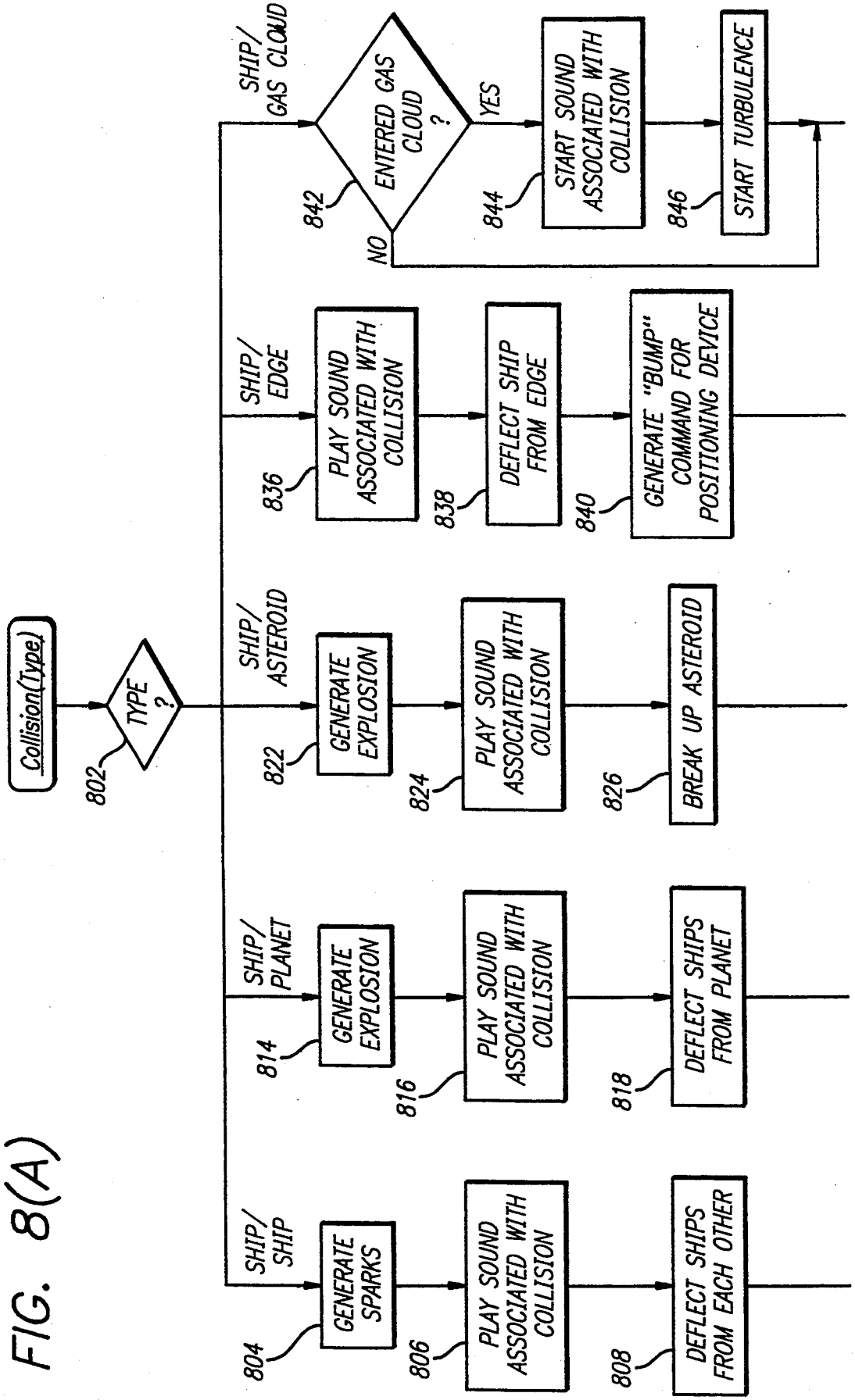
FIG. 8 is a flow diagram illustrating a method for identifying the type of a collision.
Figure 8B:
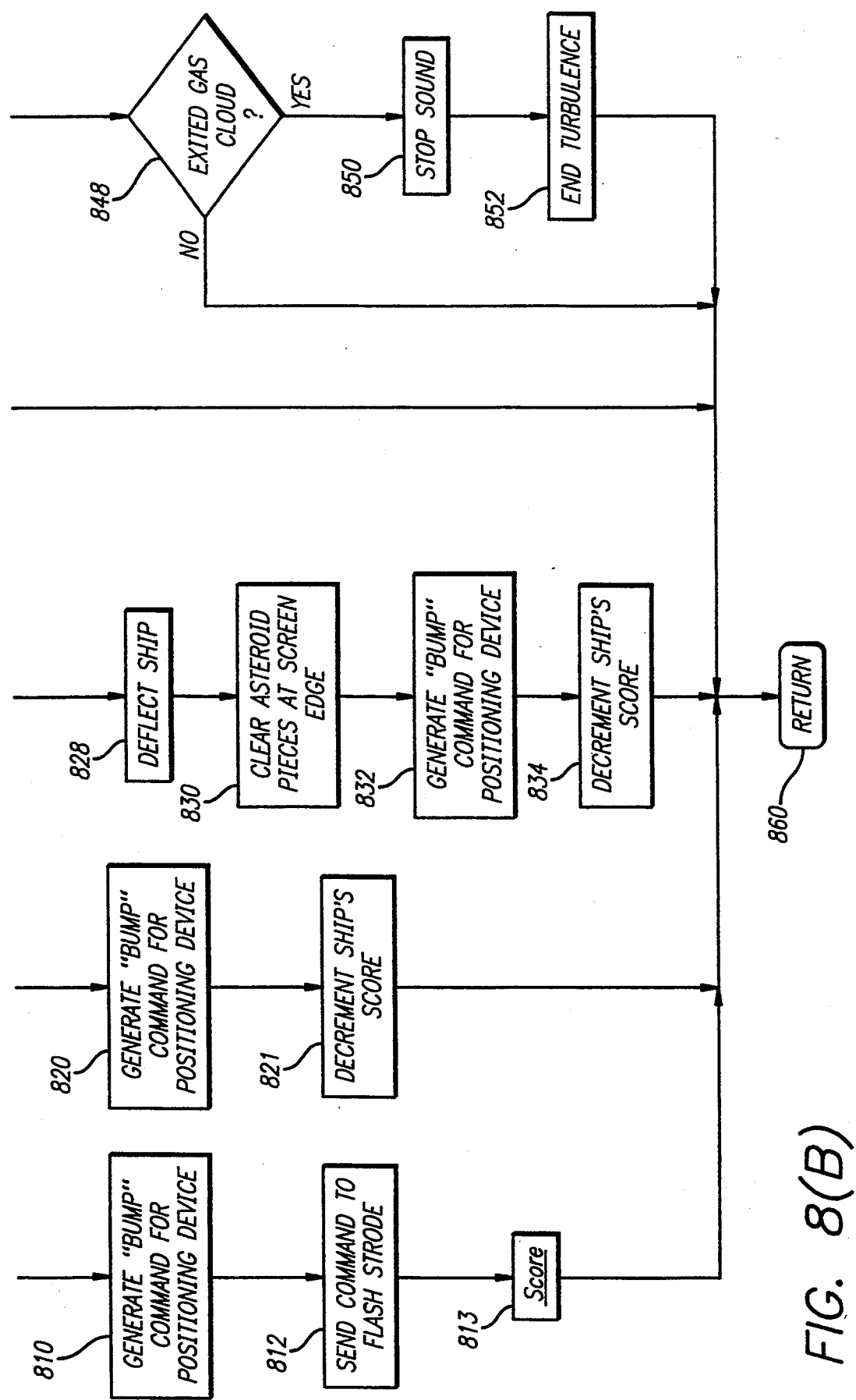

Referring to FIG. 8, the type of game objects involved in a collision determines the type of output generated by the system to simulate a collision. Thus, at decision block 802 (i.e., "type?"), the type of objects involved in the collision is examined. If two ships collide, sparks are generated at processing block 804.

A collision further provides audio feedback. The present invention includes a MIDI sound effects generation means to provide additional player feedback. Each positioning device used in the present invention has an associated MIDI channel. When two ships collide, the sound associated with the collision is sent over each of the channels assigned to the involved ships at processing block 806.

Further, in the present invention ships are treated as having equal mass. Thus, the ships rebound from one another at block 808. A "bump" signal is sent to the positioning device's controller at block 810. The "bump" commands results in a slight jolt of the positioning device of each player of a ship involved in the collision. This provides additional feedback that a collision has occurred. Finally, a command is generated to flash strobe lights associated with each positioning device at block 812. Scoring is invoked to at processing block 813 to determine the score modifications for each ship. Processing returns to GamePlayModule at block 860 (i.e., processing block 407 in GamePlayModule).

Ship-Planet Collision

If it is determined at decision block 802 of FIG. 8 that a ship and a planet are involved in the collision, processing continues at processing block 814. An explosion is generated at processing block 814. The sound associated with a collision between a ship and planet is sent over the channel assigned to the involved ship at processing block 816. The ship is deflected from the planet (i.e., repelled) at block 818. A "bump" signal is sent to the positioning device controller associated with the ship at block 820. The "bump" commands results in a slight jolt of the positioning device on which the ship's player stands. The ship's score is decremented at processing block 821. Processing returns to GamePlayModule at block 860 (i.e., decision block 407 in GamePlayModule).

Ship-Asteroid Collision

If it is determined at decision block 802 of FIG. 8 that a ship and an asteroid are involved in the collision, processing continues at processing block 822. An explosion is generated at processing block 822. The sound associated with a collision between a ship and an asteroid is sent over the channel assigned to the involved ship at processing block 824. The asteroid is broken up into fragments at block 826. The ship is deflected from the asteroid at processing block 828. As the fragments of the asteroid reach the edge of the combined display, the pieces are removed from the display at processing block 828. As a further result of the collision, a "bump" signal is sent to the positioning device controller associated with the ship at block 832. The "bump" commands results in a slight jolt of the positioning device upon which the ship's player stands. Further, the ship's score is decremented at processing block 834. Processing returns to GamePlayModule at block 860 (i.e., decision block 407 in GamePlayModule).

Ship-Edge Collision

If it is determined at decision block 802 of FIG. 8 that a ship and an edge of the combined display are involved in the collision, processing continues at processing block 836. The sound associated with a collision between a ship and edge is sent over the channel assigned to the involved ship at processing block 836. The ship is deflected from the edge at block 838. A "bump" signal is sent to the positioning device controller associated with the ship at block 840. The "bump" commands results in a slight jolt of the positioning device upon which the ship's player stands. Processing returns to GamePlayModule at block 860 (i.e., decision block 407 in GamePlayModule).

Ship-Gas Cloud Collision

If it is determined at decision block 802 of FIG. 8 that a ship and a gas cloud are involved in the collision, processing continues at decision block 842. If, at decision block 842 (i.e., "entered gas cloud?"), the ship has not entered the gas cloud, processing returns to GamePlayModule at block 860 (i.e., decision block 407 in GamePlayModule). If the ship has entered the gas cloud, processing continues at processing block 844. The sound associated with a collision between a ship and planet is sent over the channel assigned to the involved ship at processing block 844. The ship is able to travel through a gas cloud. However, the ship experiences a turbulent effect while inside the gas cloud. Thus, at processing block 846, a signal is generated to the positioning device's controller to start the turbulence. At decision block 848 (i.e., "exited gas cloud?"), if the ship has not exited the gas cloud, processing continues at processing block 860 to return to GamePlayModule at block 860 (i.e., decision block 407 in GamePlayModule). If the ship has exited the gas cloud, the sound is terminated at processing block 850, the turbulence is terminated at processing block 852, and processing returns to GamePlayModule at block 860 (i.e., decision block 407 in GamePlayModule).

Collision and Turbulence Variations

To provide the collision and turbulence effects, the Device Controller 150 pulses the kick cylinder at various rates. To vary the feedback generated by the present invention, the effects provided by the present invention can be based on one or more factors such as the player's weight, type of collision, or the involvement of more than one collision type. Using the table driven method including a collision table and a turbulence table, various collision and turbulence effects can be produced.

The collision and turbulence tables are three-dimensional arrays containing type, weight, and index data. In the collision and turbulence tables, type defines the number of different collision or turbulence (respectively) types to be implemented, weight is the number of weight ranges, and index is the number of on/off pulse times required to produce the desired effect.

The positioning device can provide the algorithms for producing the various collision and turbulence feedback effects for the game player. The two extensible three-dimensional collision and turbulence arrays are used to provide an instance of a series of on and off pulse times to be used to activate kick valve 166 in order to produce a wide variety of possible feedback effects. The instance (i.e., row/column) of the array to be used for a required effect is determined in the present invention by the weight of the player and the speed of collision or turbulence as specified by CPU 100 via communications channel 145. The algorithm steps through the selected array, pulsing kick valve 166 either on or off for the specified duration in the requisite array entry.

For example, once the weight and type are determined, the Device controller can provide collision feedback by pulsing the kick cylinder as specified in the table until the end of the on/off pulse times are reached or a kick limit is detected. In the case of the turbulence effects, the device controller can continue to cycle the on/off pulse train until the game computer signals the end of the turbulence. If a kick limit is triggered during the effect generation, the kick cylinder signal will be turned off and the device controller will step to the first off pulse time in the column.

Scoring

The GamePlayModule must determine whether a collision should result in a score tally change. While detection of any collision can result in a score tally change, the preferred embodiment of the present invention modifies a score based on three types of collisions: ship-ship, ship-planet, and ship-asteroid. A collision between a ship and a planet or asteroid results in a decrement of the ship's score at processing blocks 821 and 831 (i.e., FIG. 8), respectively.

Figure 9B:
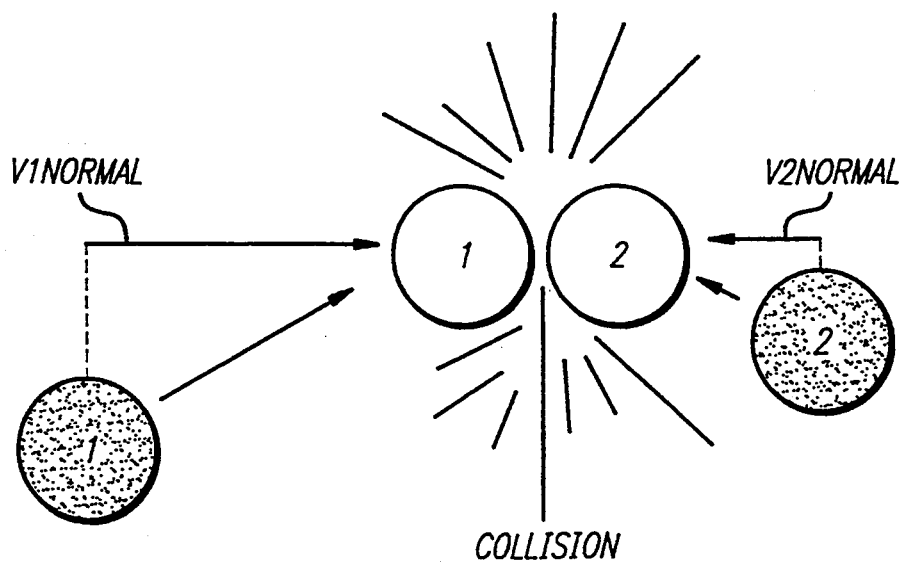
FIG. 9B illustrates velocity normal to the collision point.
Figure 9A:
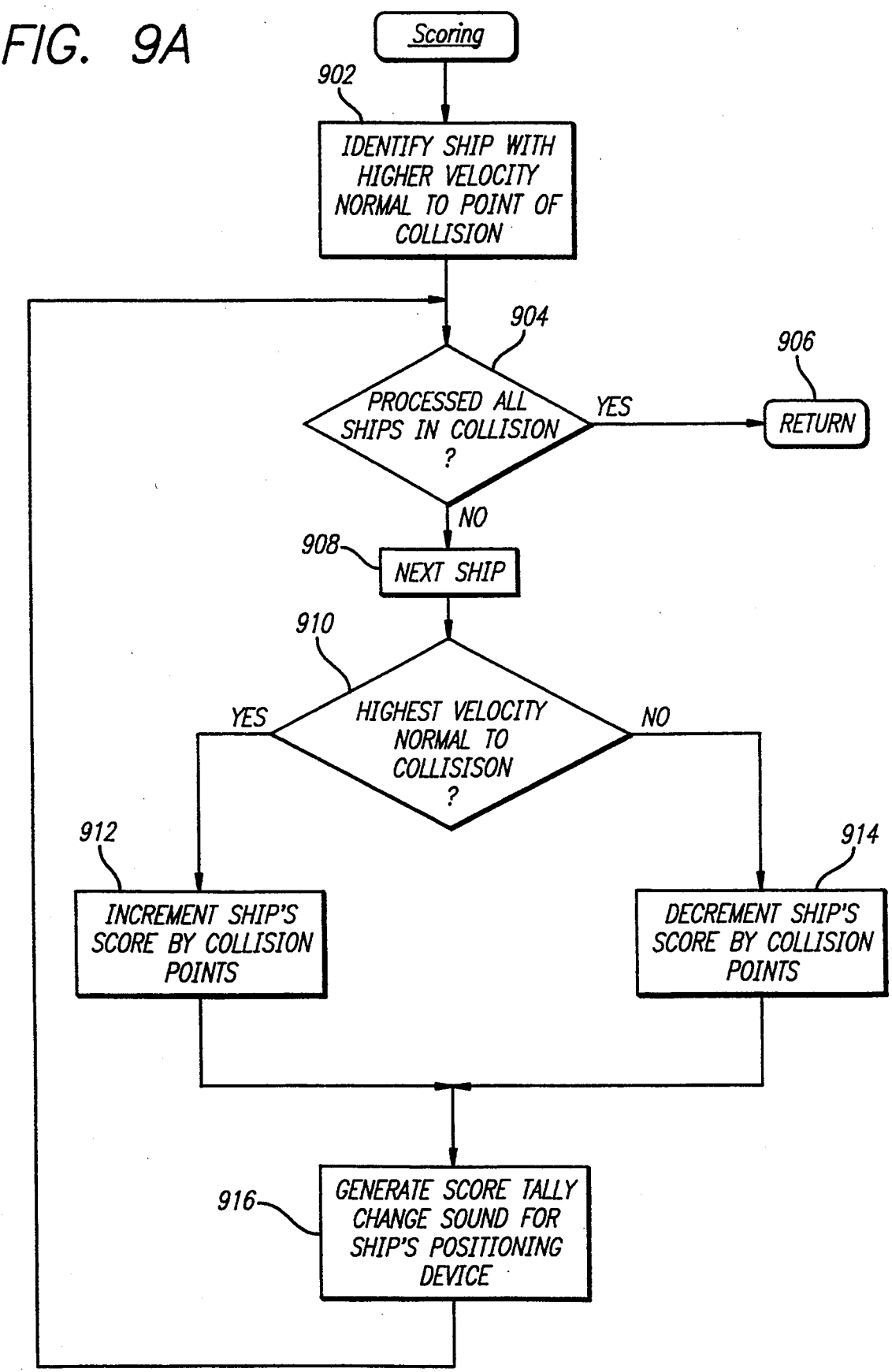
FIG. 9A is a flow diagram illustrating the scoring of the invention.

A collision between two ships results in an increase in the score of one of the involved ships. The other ship's score is decreased. FIG. 9A, illustrates a process flow for determining the score modifications for each ship. The ship that has the higher velocity normal to the point of collision is identified at processing block 902. Referring to FIG. 9B, the velocity normal for each ship (i.e., $V_{1Normal}$ and $V_{2normal}$) involved in the collision is determined relative to the point of collision. For example, $V_{1Normal}$ is normalized to the same horizontal plane in which the collision took place. Similarly, $V_{2Normal}$'s velocity is normalized to the collision plane. Because Ship 1'a $V_{Normal}$ is greater than Ship 2's $V_{Normal}$, Ship 1's score will be incremented, and Ship 2's score will be decremented.

The ship with the higher velocity normal is identified at processing block 902. At decision block 904 (i.e., "processed all ships in collision?"), if the score for each ship involved in the collision has been updated, processing returns to GamePlayModule at block 906 (i.e., decision block 407 in GamePlayModule).

If all of the scores have not been updated, processing continues at block 906 to get the next ship. At decision block 910 (i.e., "highest velocity normal?") if the ship being processed is determined to have the highest velocity normal to the point of collision, the ship's score is incremented by the number of points associated with a ship-to-ship collision at processing block 912. If not, the ship's score is decremented by the number of points associated with a ship-to-ship collision at processing block 914. In either case, processing continues at block 916 to generate a score tally change sound for the ship. Processing continues at decision block 904 (i.e., "processed all ships in collision?").

Display Update

Referring to FIG. 4, if a display update is not necessary at decision block 424 (i.e., "screen update?"), processing continues at decision block 407 (i.e., "processing necessary?") to identify other processing requirements. If a screen update is necessary, ScreenUpdate is invoked at processing block 426. The present invention updates the screen by moving the game objects across the combined display according to the direction input received from a player, and the acceleration and velocity calculations derived from a player's input. Based on the input, a ship appears to be traveling in the direction of the player's movement, and at a speed that corresponds with the degree of tilt of the position device.

Display System

Figure 15:
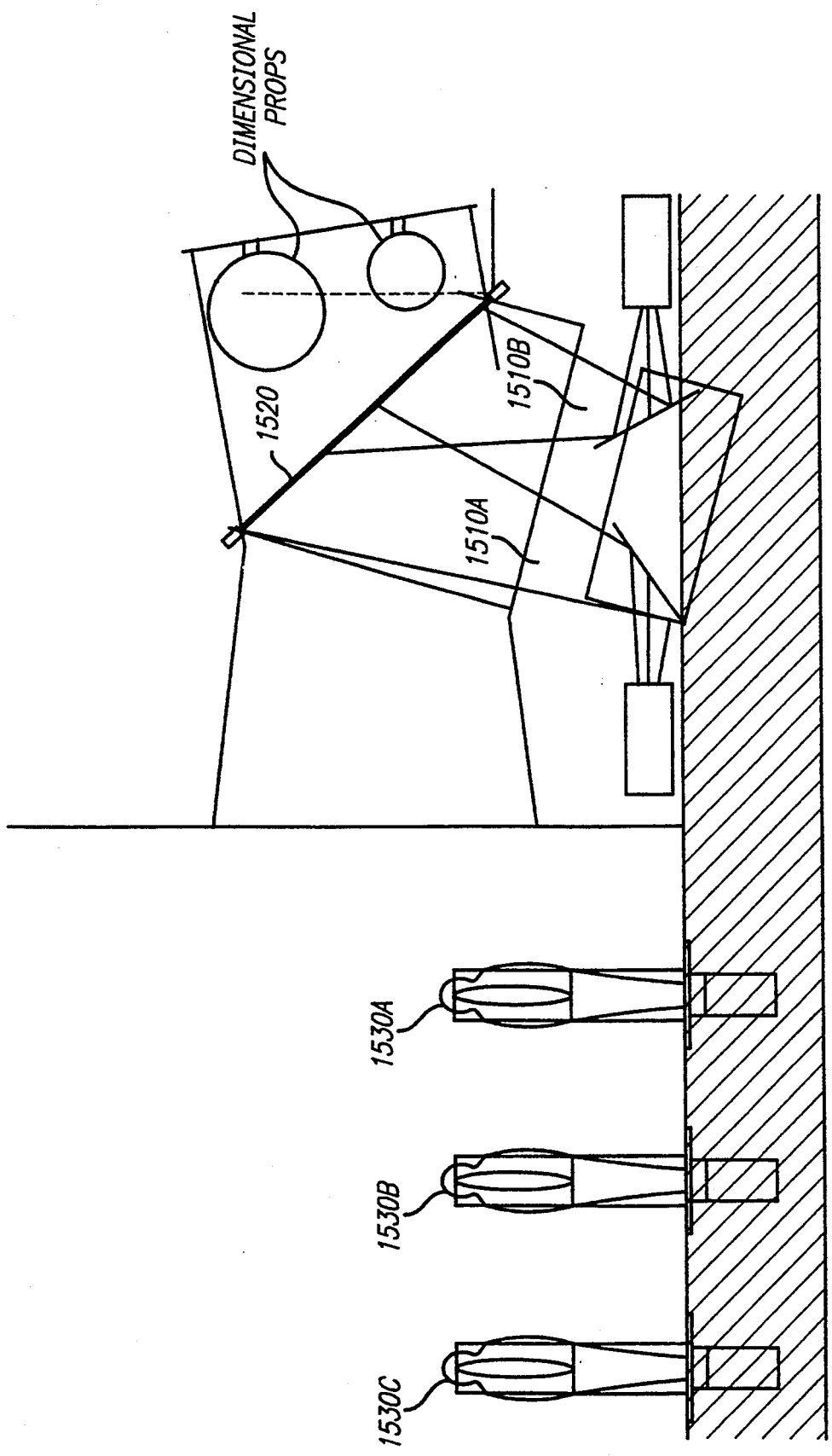
FIG. 15 illustrates the beam splitter of the present invention.

The present invention presents a relatively large display surface to the players. For example, in one embodiment of the invention, the display region is approximately six feet by eight feet in area. In this invention, the video portion of the display is accomplished by projecting images from a two by two array of monitors onto a reflective "pepper's ghost" beam splitter. An example of the arrangement of the invention is illustrated in FIG. 15. Monitors 1510A and 1510B project a video image onto reflective glass 1520. The projected image is reflected to the players 1530A–1530C in front of the display.

Three dimensional props may be disposed behind glass 1520. Such objects are visible to viewers on the other side of the glass 1520 and are merged with the projected images into a single combined image. Referring to FIG. 14, the planets 1320 and 1330 are not necessarily visible on the display. However, they represent the boundaries of the three dimensional props illustrated in FIG. 15. When a ship encounters a boundary, it appears to collide with the prop and then bounces off. In other words, project planets 1320 and 1303 are registered with their respective props.

Figure 12:
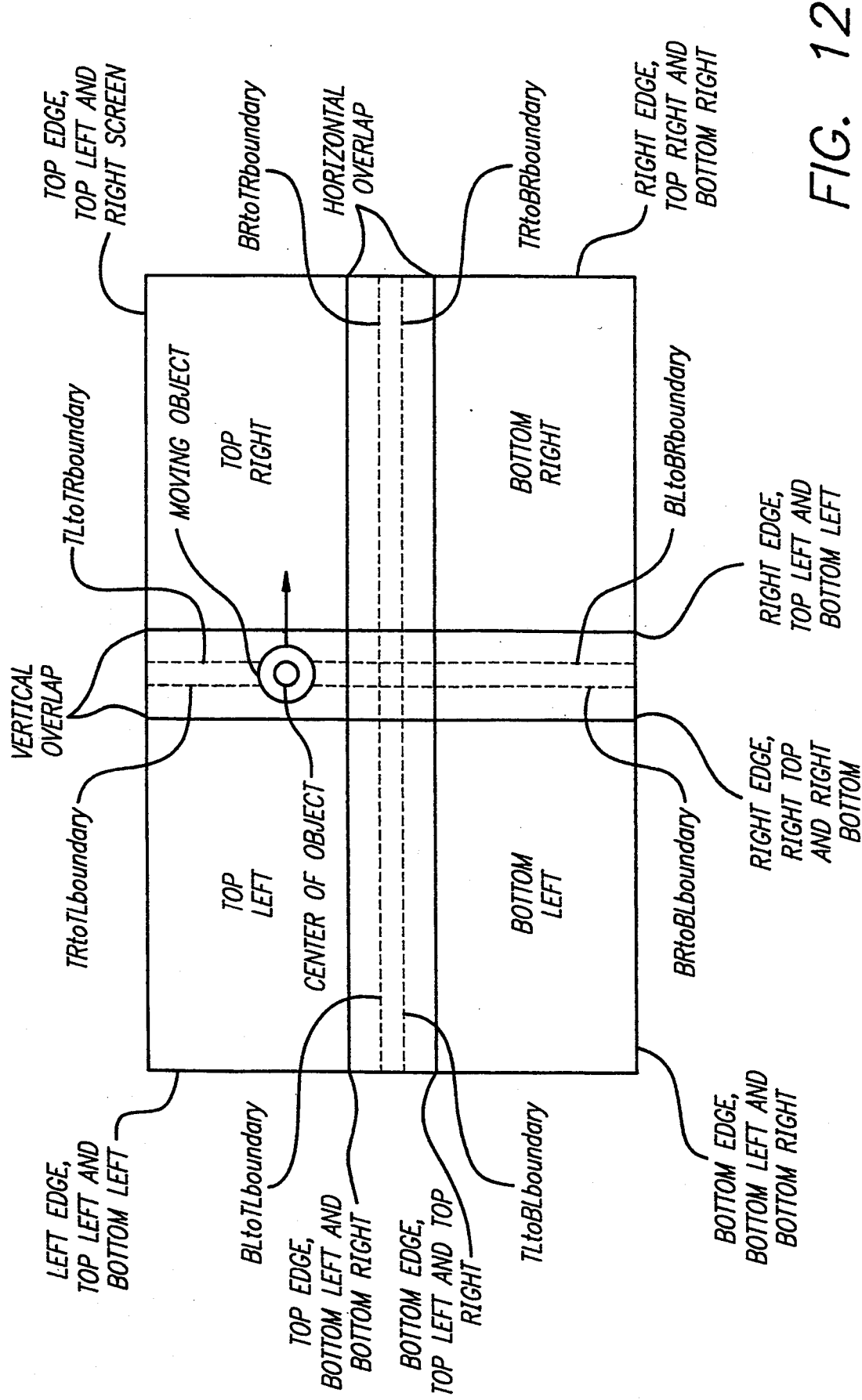
FIG. 12 illustrates display region crossover.

There is an overlap of the images projected by the array of four monitors. The present invention provides an ability to generate a seamless transition between the multiple video projectors tiled together to create a combined display. FIG. 12 illustrates a combined display that is comprised of four screens tiled together in a quadrant pattern. The Top Left (TR) screen is the screen in the top left quadrant of the display. The Top Right (TR) is in the top right. The Bottom Left (BL) and Bottom Right (BR) screens are in the bottom left and bottom right screens of the display.

The top half of the combined display is delimited by the top edge of the top left and right screen, and the bottom edge of the top left and top right screens (i.e., TL and TR screens). Similarly, the bottom half of the combined display is delimited by the top edge and bottom edges of the bottom left and bottom right screens (i.e., BL and BR screens). The left half of the combined display is delimited by the left edges of the top left and bottom left screens (i.e., TL and BL screens). Similarly, the right half of the combined display is delimited by the right edges of the top right and bottom right screens (i.e., TR and BR screens).

A screen object is positioned in the TL screen and is moving in the direction of the TR screen. Thus, its current screen position is TL. The x and y coordinates represent the position of the object in the TL screen. The coordinates are taken at the center of the object, and the object is assumed to be approximately circular as shown in FIG. 12. If the object reaches the TRtoTLboundary, the present invention transfers the object to the TR screen. To transfer an object, the object's current screen designation is changed to TR. Further, the x and y coordinates are updated to reflect the coordinates in the TR screen.

The top left corner of the top left screen is considered to have a (0,0) x-y coordinate value. Each object has two sets (i.e., and x and y value) of coordinates: $XY_{currscrn}$ (i.e., x-y coordinates relative to the top left corner of the object's current screen), and $XY_{topleft}$ (i.e., x-y coordinates relative to the top left corner of the top left screen). Further, each screen has a set of coordinates locating its top left corner relative to the top left corner of the top left screen. The coordinates of the object within a particular screen can be computed by subtracting $XY_{currscrn}$ from $XY_{topleft}$.

Figure 10A:
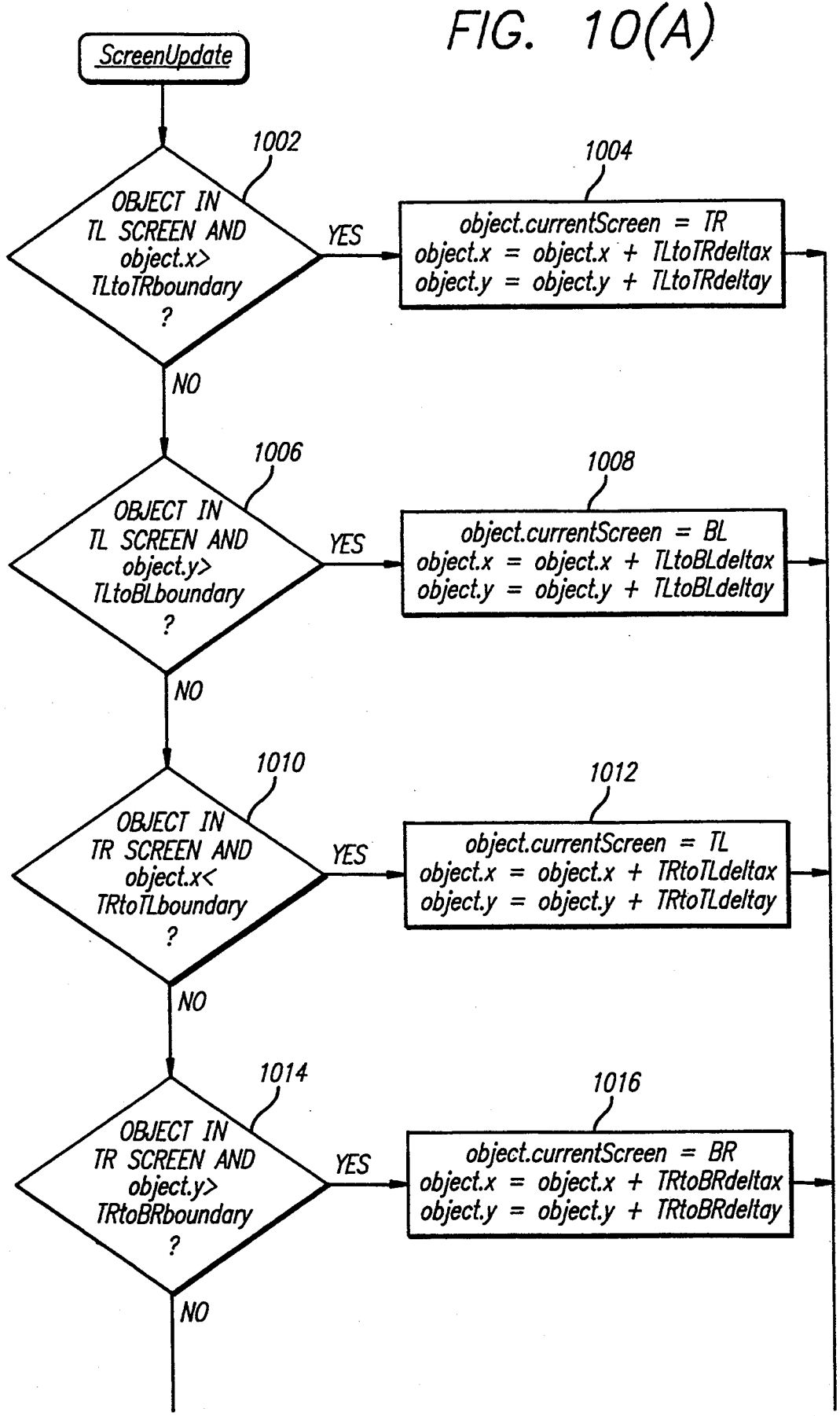
FIG. 10 is a flow diagram illustrating screen update.
Figure 10B:
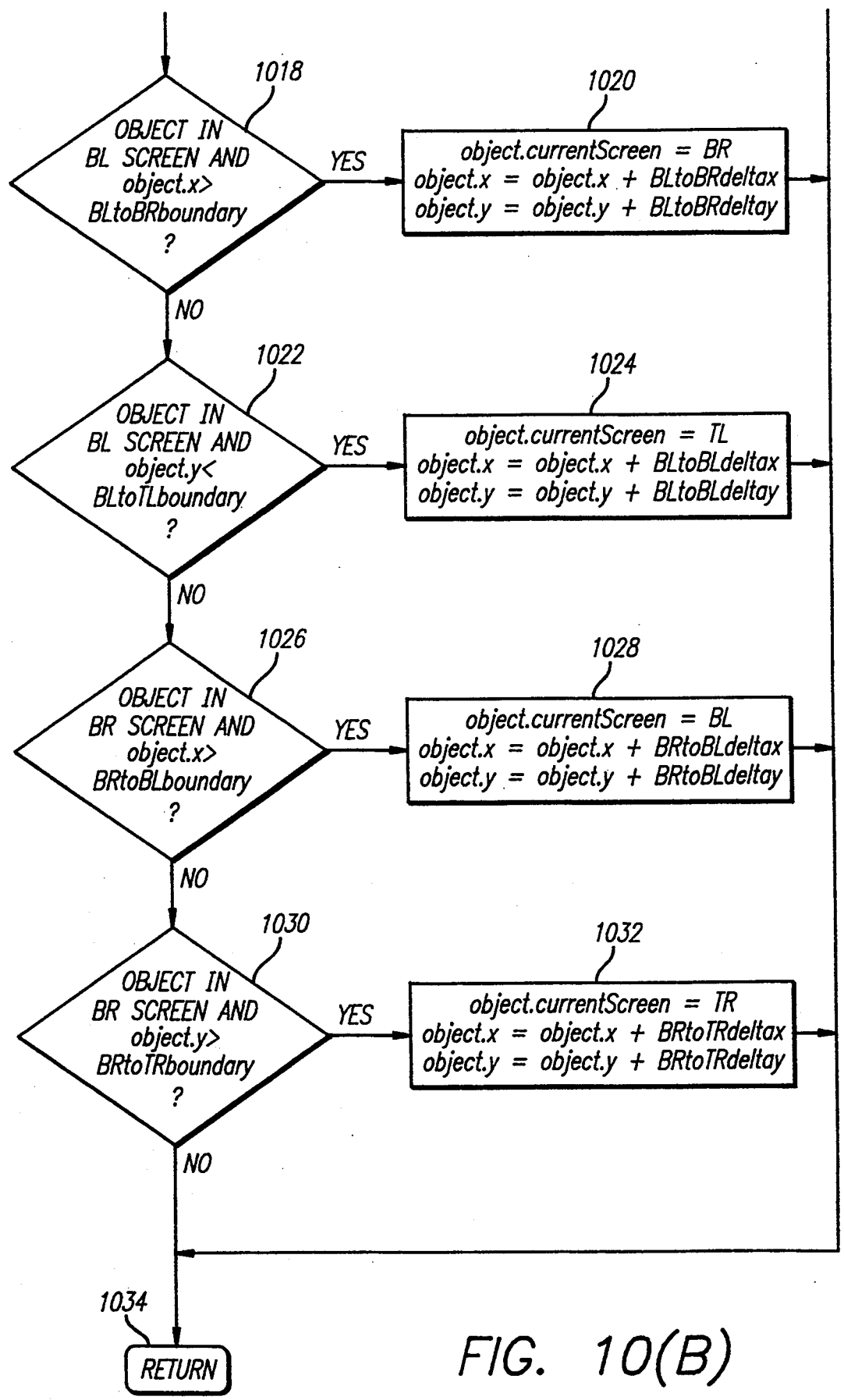

FIG. 10 provides an implementation flow for transferring a game object across multiple screens. At decision block 1002 (i.e., "object in TL screen and object.x>TLtoTRboundary?"), if the game object is located in the TL screen and the object's x coordinate is greater than TLtoTRboundary (i.e., the object has crossed the TLtoTRboundary), the object is transferred to the TR screen at processing block 1004. That is, the object's current screen designation is updated to TR. Further, the object's x coordinate is modified by the TLtoTRdeltax value, and the object's y coordinate is modified by the TLtoTRdeltay value. Processing returns at 1034 to GamePlayModule.

If the object is not in the TL screen or the game object has not crossed the TLtoTRboundary, processing continues at decision block 1006. At decision block 1006 (i.e., "object in TL screen and object.y>TLtoBLboundary?"), if the game object is located in the TL screen and the object's y coordinate is greater than the TLtoBLboundary (i.e., the object has crossed the TLtoBLboundary), the object is transferred to the BL screen at processing block 1008. That is, the object's current screen designation is updated to BL. Further, the object's x coordinate is modified by the TLtoBLdeltax value, and the object's y coordinate is modified by the TLtoBLdeltay value. Processing returns at 1034 to GamePlayModule.

If the object is not in the TL screen or the game object has not crossed the TLtoBLboundary, processing continues at decision block 1010. At decision block 1010 (i.e., "object in TR screen and object.x<TRtoTLboundary?"), if the game object is located in the TR screen and the object's x coordinate is greater than the TRtoTLboundary (i.e., the object has crossed the TRtoTLboundary), the object is transferred to the TL screen at processing block 1012. That is, the object's current screen designation is updated to BL. Further, the object's x coordinate is modified by the TRtoTLdeltax value, and the object's y coordinate is modified by the TRtoTLdeltay value. Processing returns at 1034 to GamePlayModule.

If the object is not in the TR screen or the game object has not crossed over into the TL screen limits, processing continues at decision block 1014. At decision block 1014 (i.e., "object in TR screen and object.y>TRtoBRboundary?"), if the game object is located in the TR screen and the object's y coordinate is greater than the TRtoBRboundary (i.e., the object has crossed the TRtoBRboundary), the object is transferred to the BR screen at processing block 1016. That is, the object's current screen designation is updated to BR. Further, the object's x coordinate is modified by the TRtoBRdeltax value, and the object's y coordinate is modified by the TRtoBRdeltay value. Processing returns at 1034 to GamePlayModule.

If the object is not in the TR screen or the game object has not crossed the TRtoBRboundary, processing continues at decision block 1018. At decision block 1018 (i.e., "object in BL screen and object.x>BLtoBRboundary?"), if the game object is located in the BL screen and the object's x coordinate is greater than the BLtoBRboundary (i.e., the object has crossed the BLtoBRboundary), the object is transferred to the BR screen at processing block 1020. That is, the object's current screen designation is updated to BR. Further, the object's x coordinate is modified by the BLtoBRdeltax value, and the object's y coordinate is modified by the BLtoBRdeltay value. Processing returns at 1034 to GamePlayModule.

If the object is not in the BL screen or the game object has not crossed the BLtoBRboundary, processing continues at decision block 1022. At decision block 1022 (i.e., "object in BL screen and object.y<BLtoTLboundary?"), if the game object is located in the BL screen and the object's y coordinate is less than the BLtoTLboundary (i.e., the object has crossed the BLtoTLboundary), the object is transferred to the TL screen at processing block 1024. That is, the object's current screen designation is updated to TL. Further, the object's x coordinate is modified by the BLtoTLdeltax value, and the object's y coordinate is modified by the BLtoTLdeltay value. Processing returns at 1034 to GamePlayModule.

If the object is not in the BL screen or the game object has not crossed the BLtoTLboundary, processing continues at decision block 1026. At decision block 1026 (i.e., "object in BR screen and object.x>BRtoBLboundary?"), if the game object is located in the BR screen and the object's x coordinate is greater than the BRtoBLboundary (i.e., the object has crossed the BRtoBLboundary), the object is transferred to the BR screen at processing block 1028. That is, the object's current screen designation is updated to BR. Further, the object's x coordinate is modified by the BRtoBLdeltax value, and the object's y coordinate is modified by the BRtoBLdeltay value. Processing returns at 1034 to GamePlayModule.

If the object is not in the BR screen or the game object has not crossed the BRtoBLboundary, processing continues at decision block 1030. At decision block 1030 (i.e., "object in BR screen and object.y>BRtoTRboundary?"), if the game object is located in the BR screen and the object's y coordinate is greater than the BRtoTRboundary (i.e., the object has crossed the BRtoTRboundary), the object is transferred to the TR screen at processing block 1032. That is, the object's current screen designation is updated to TR. Further, the object's x coordinate is modified by the BRtoTRdeltax value, and the object's y coordinate is modified by the BRtoTRdeltay value. Processing returns at 1034 to GamePlayModule. If the object is not in the BR screen or the game object has not crossed the BRtoTRboundary, processing returns at 1034 to GamePlayModule.

End of Game

Referring to FIG. 4, if an end of game is not detected at decision block 428 (i.e., "end of game?"), processing continues at decision block 407 (i.e., "processing necessary?") to identify other processing requirements. If an end of game is detected at decision block 428, GameEndProcessing is invoked at processing block 430.

Figure 11:
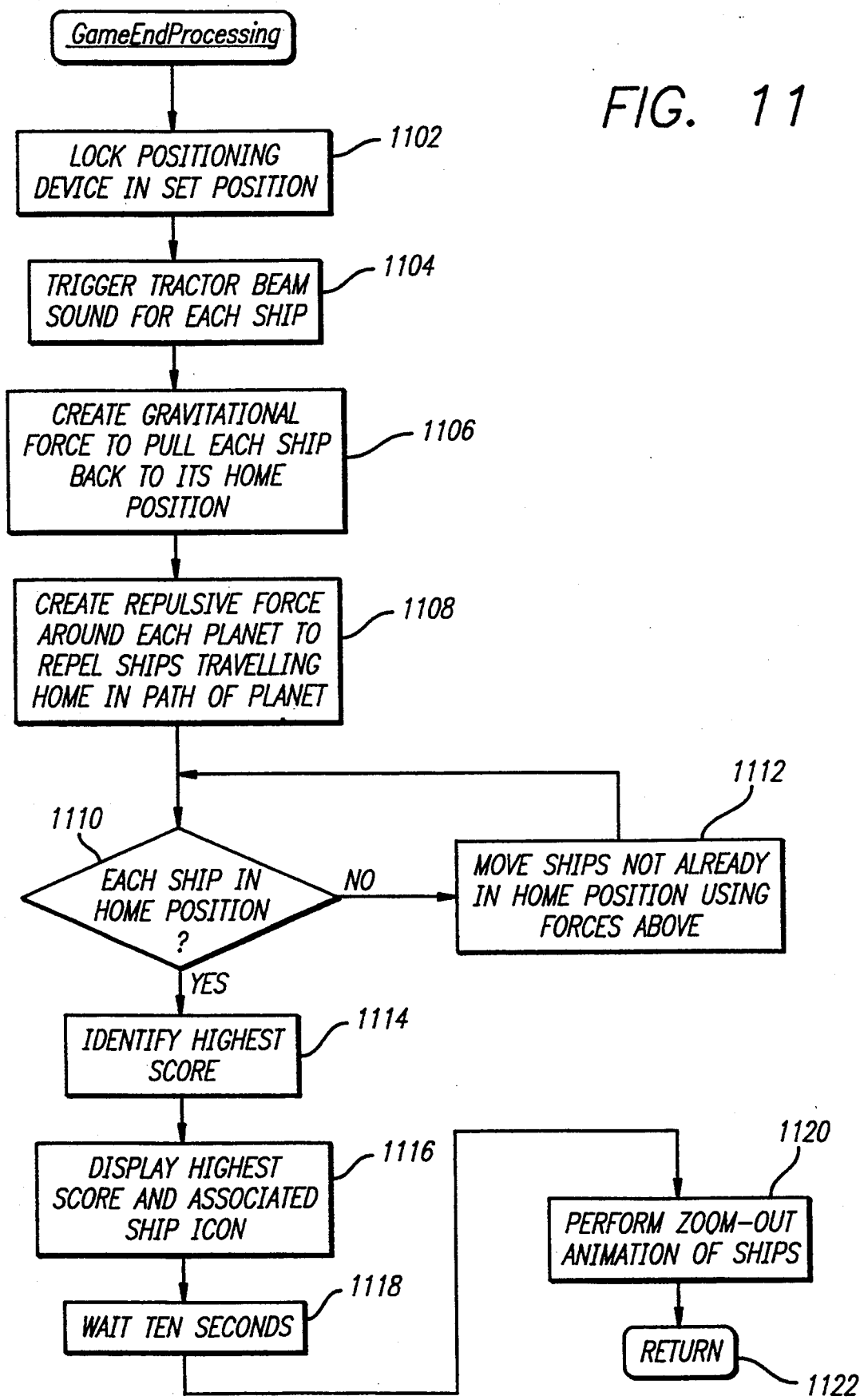
FIG. 11 is a flow diagram illustrating the end of game sequence.

Referring to FIG. 11, a signal is generated to place the positioning device in a locked position at processing block 1102. A signal is sent to the MIDI device to generate a tractor beam sound for each ship at processing block 1104. A gravitational force is generated to pull each ship back to its home position at processing block 1106. At processing block 1108, a repulsive force is placed around each planet to repel any ship as it passes by or within a planet's path on its way back to its home position. If all ships are not in home position at decision block 1110 (i.e., "each ship in home position?"), processing continues at processing block 1112. At processing block 1112, any ships not already in home position are moved to home position using the previously described forces.

After all ships are determined to be in home position at decision block 1110 (i.e., "each ship in home position?"), the high score is identified at processing block 1114. The high score is displayed on the combined display along with the associated ship icon at processing block 1116. At processing block 1118, a ten-second wait is invoked. At processing block 1120, a zoom-out animation of the ships is performed. Processing returns to GamePlayModule at block 1122 (i.e., block 432 in GamePlayModule). Referring to FIG. 4, processing returns at block 432. Referring to FIG. 2, the system returns to attract mode to attract another group of players. Further, while a game is not active, the positioning devices are placed in their locked, stationary positions.

System Overview

FIG. 1A illustrates the components of the present invention. In the preferred embodiment, Computer 100 is an IBM PS/2-95 and Central Processing Means (CPU) is a 80486 microprocessor. CPU 102 executes the main algorithms of the present invention with controller 150 executing algorithms to perform collision and turbulence feedback effects. CPU 102 is connected to a bi-directional communications bus 147 via line 101. Memory Storage Means 142 stores the variable information, and other information of the present invention. Memory Storage Means 142 is coupled to bus 147 via line 141.

Graphics Controller 104 provides program control to Video Projection Means 106A-106N via lines 105A-105N. In the preferred embodiment, Graphics Controller 104 is an XGA graphics adapter. Video Projection Means 106A-106N are tiled together to provide an expanded, combined display. For example, four Video Projection Means can be tiled together in a quadrant pattern to form a nine foot by fifteen foot combined display. The present invention provides the ability to synchronize the video output to each tile such that the tiled display appears to be one, continuous display.

Additional output is provided by Monitors 114A-114N. Monitors 114A-114N receive video input from Laser Disc 112A-112N through 113A-113N, respectively. In the preferred embodiment, Monitors 114A-114N form two display arrays on either side of the combined display formed by Video Projection Means 106A-106N. Monitors 114-114N receive video signals through lines 113A-113N from Laser Discs 112A-112N, respectively. Video Controller 110 provides control signals to Laser Discs 112A-112N through lines 111A–111N, respectively. Computer 100 interfaces with Video Controller via Serial I/O Interface 108 and serial channel 109.

Audio output is provided from Speaker 120 and Speaker 122 that are placed on either side of the two arrays formed by Monitors 114A–114N. Speaker 120 receives input from Amplifier 116 through line 117. Amplifier 116 receives signal 115B from Laser Disc 112A. Similarly, Speaker 122 receives audio input from Amplifiers 118 through line 119. Amplifier 118 receives signal 115A from Laser Disc 112A.

The present invention provides the ability to control objects displayed on the combined display formed by Video Projection Means 106A–106N using positioning devices 146A–146N. Positioning devices 146A–146N are coupled to Positioning Device Controllers 144A–144N through lines 145A–145N, respectively. Positioning Device Controllers 144A–144N communicate with Serial I/O Interface 108 via serial channels 143A–143N, respectively.

Additional audio output is provided by Speakers 132A–132N, 36A–136N, and Speaker 140. One of speaker Speakers 132A–132N and 36A–136N is positioned in close proximity to each of the positioning devices 46A–146N. Speakers 132A–132N receive input 131A–131N, respectively, from amplifier 130. Amplifier 130 receives signal 129 from Digital Audio Storage Means 126. Digital Audio Storage Means is coupled to Computer 100 through line 125 and MIDI interface 124. Speakers 136A–136N receive input 135A–135N, respectively, from amplifier 134. Amplifier 134 is coupled to Digital Audio Storage Means 128 via 133A. Digital Audio Storage Means 128 receives input from Computer 100, and Digital Audio Storage Means 126 through line 127.

Speaker 140 is positioned near the center of the combined display formed by Video Projection Means 106A–106N. In the preferred embodiment, speaker 140 is a sub-woofer. Speaker 140 receives input from amplifier 138 through line 139. Amplifier 138 is coupled to Digital Audio Storage Means 128 via 133B. Digital Audio Storage Means 128 receives input from Computer 100 and Digital Audio Storage Means 126 through line 127.

Game Computer—Device Communications

The device controller provides information to the game computer to allow the game computer to respond to a player's movements and pilot the player's icon around the game screen. The game computer sends commands to the device controller to perform game-related and maintenance-related activities.

In the preferred embodiment of the present invention, normal messages sent by the device controller to the game computer consist of the following:

<FF><Code><Status><Weight><X-><Y>, where:

FF is a message start/synch byte;
Code is a message code;
Status is the status of the device controller (e.g., turbulence effect in progress, game play in progress, or error reading x or y input);
Weight is the current player's weight input;
X is the x-coordinate positioning information; and
Y is the y-coordinate positioning information.

Messages sent from the game computer to the device controller are either of the form:

<FF><command> or <FF><command-><data>, where FF has the same function as above. The command field contains the commands for the device controller such as start, stop, score, collision, turbulence, or calibrate, shutdown. The data field(s) are used to pass data generated by the game computer to the device controller. For example, a score command includes a player's score to be updated. The collision and turbulence commands include speed information.

Thus, a method and apparatus for an interactive video game with physical feedback has been provided.

We claim:

1. A system comprising:
   display means for displaying a plurality of display icons;
   a plurality of positioning means, each responsive to weight shift of a player for generating position signals indicative of the position of said positioning means, each of said plurality of positioning means associated with one of said plurality of display icons;
   processing means coupled to said positioning means and said display means for translating said position signals to display coordinates and for moving said each of said display icons to display coordinates generated by a positioning means associated with said each of said display icons;
   feedback means for providing a physical response to a player when a display icon associated with a positioning means of said player collides with a display icon associated with a positioning means of another player.

2. The system of claim 1 wherein said processing means includes means for determining velocity of display icons involved in a collision.

3. The system of claim 2 wherein points are awarded to a player associated with a display icon having a higher velocity than another display icon in a collision.

4. The system of claim 3 wherein points are deducted from a player associated with a display icon having a lower velocity than another display icon in a collision.

5. The system of claim 1 wherein a collision is determined when two or more display icons occupy substantially the same position on said display.

6. The system of claim 1 wherein said positioning device comprises a support member and a steering member coupled to said support member.

7. The system of claim 6 wherein said support member is suspended using a hydraulic suspension means.

8. The system of claim 7 wherein said feedback means comprises a kickback valve coupled to said hydraulic suspension means for selectably displacing said suspension means to simulate a bump.

9. The system of claim 8 wherein said support member is substantially disk shaped.

10. The system of claim 1 further including a first object on said display means at a fixed location and where points are deducted when a display icon associated with one of said plurality of positioning devices collides with said first object.

11. The system of claim 1 further including a second object moving on said display means and where points are deducted when a display icon associated with one of said plurality of positioning devices collides with said second object.

* * * * *